US012791299B2

(12) United States Patent
Wagner et al.

(10) Patent No.: US 12,791,299 B2
(45) Date of Patent: Nov. 10, 2026

(54) ALIGNMENT TOOL FOR A SPRAY GUN

(71) Applicant: Graco Minnesota Inc., Minneapolis, MN (US)

(72) Inventors: Christopher C. Wagner, Saint Anthony, MN (US); Dawn P. Svenkeson-Koubal, Wayzata, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 446 days.

(21) Appl. No.: 18/202,070

(22) Filed: May 25, 2023

(65) Prior Publication Data

US 2024/0295392 A1 Sep. 5, 2024

Related U.S. Application Data

(60) Provisional application No. 63/449,820, filed on Mar. 3, 2023.

(51) Int. Cl.

| | |
|---|---|
| ***G01B 5/25*** | (2006.01) |
| ***B05B 7/02*** | (2006.01) |
| ***B05B 12/00*** | (2018.01) |

(52) U.S. Cl.

CPC .................. *G01B 5/25* (2013.01); *B05B 7/02* (2013.01); *B05B 12/002* (2013.01)

(58) Field of Classification Search

CPC ........... G01B 5/25; G01B 11/026; B05B 7/02; B05B 12/002; B05B 1/3046; B05B 7/066; B05B 12/124; B05B 7/083

USPC ........................................................... 33/286

See application file for complete search history.

(56) References Cited

U.S. PATENT DOCUMENTS

| | | | |
|---|---|---|---|
| 4,533,005 | A | 8/1985 | Morris |
| 5,639,025 | A | 6/1997 | Bush |
| 5,941,463 | A | 8/1999 | Herstek et al. |
| 6,036,109 | A | 3/2000 | Deyoung |
| 6,267,302 | B1 | 7/2001 | Huffman |
| 6,460,787 | B1 | 10/2002 | Hartle et al. |
| 6,568,097 | B2 | 5/2003 | Eckard |
| 6,854,667 | B2 | 2/2005 | Ulrich et al. |
| 6,860,438 | B1 | 3/2005 | Huang |
| 6,978,944 | B1 | 12/2005 | Carey et al. |
| 7,040,546 | B2 | 5/2006 | Horan et al. |
| 7,458,524 | B2 | 12/2008 | Prieto et al. |
| 9,421,562 | B2 | 8/2016 | Krayer |
| 9,802,211 | B2 | 10/2017 | Joseph et al. |

(Continued)

FOREIGN PATENT DOCUMENTS

| | | | | |
|---|---|---|---|---|
| AU | 2014290641 A1 * | 2/2016 | | B05B 7/066 |
| CN | 2746363 Y | 12/2005 | | |

(Continued)

OTHER PUBLICATIONS

Extended European Search Report for EP Application No. 22159054.0, dated Aug. 8, 2022, 8 pages.

(Continued)

*Primary Examiner* — Laura Martin Sweeney
(74) *Attorney, Agent, or Firm* — Kinney & Lange

(57) ABSTRACT

An alignment tool is configured to mount to a spray gun to be supported by the spray gun. The alignment tool includes path indicators that project from a tool body and provide an indication of the gap distance between the spray gun and a target surface prior to spraying by the spray gun.

18 Claims, 16 Drawing Sheets

(56) References Cited

U.S. PATENT DOCUMENTS

| | | | | |
|---|---|---|---|---|
| 9,802,213 | B2 | 10/2017 | Joseph et al. | |
| 9,914,144 | B2 | 3/2018 | Kosovich et al. | |
| 10,456,795 | B2 | 10/2019 | Wen | |
| 11,229,921 | B2 | 1/2022 | Haislet et al. | |
| 2005/0242207 | A1 | 11/2005 | Tejeda | |
| 2010/0224700 | A1 | 9/2010 | Woodgate et al. | |
| 2012/0261494 | A1* | 10/2012 | Krayer | B05B 7/02 239/398 |
| 2013/0092760 | A1* | 4/2013 | Joseph | B05B 7/0861 29/428 |
| 2016/0151797 | A1* | 6/2016 | Joseph | B05B 7/0815 239/296 |
| 2016/0175870 | A1 | 6/2016 | Aporta et al. | |
| 2017/0120269 | A1 | 5/2017 | Scheibner et al. | |
| 2018/0071758 | A1 | 3/2018 | Hata | |
| 2018/0236471 | A1 | 8/2018 | Sulzer et al. | |
| 2019/0143345 | A1 | 5/2019 | Hasday et al. | |
| 2019/0337007 | A1 | 11/2019 | Haislet et al. | |
| 2021/0394208 | A1 | 12/2021 | Wagner et al. | |
| 2022/0282963 | A1* | 9/2022 | Heuer | B05B 7/083 |
| 2023/0054177 | A1 | 2/2023 | Seaman | |

FOREIGN PATENT DOCUMENTS

| | | | | |
|---|---|---|---|---|
| CN | 102917803 | A | 2/2013 | |
| CN | 103501918 | A | 1/2014 | |
| CN | 105964438 | A | 9/2016 | |
| CN | 108452966 | A | 8/2018 | |
| CN | 210754139 | U | 6/2020 | |
| DE | 69121193 | | 9/1996 | |
| DE | 69121193 | T2 | 11/1996 | |
| DE | 212016000027 | U1 | 6/2017 | |
| EP | 2461909 | B1 | 1/2015 | |
| EP | 2704850 | B1 | 11/2017 | |
| GB | 175785 | A | 3/1922 | |
| GB | 313122 | A | 8/1930 | |
| GB | 1136577 | A | 12/1968 | |
| JP | H09253538 | A | 9/1997 | |
| JP | 2006218451 | A | 8/2006 | |
| JP | 2006326452 | A | 12/2006 | |
| JP | 2007144271 | A | 6/2007 | |
| KR | 102444617 | B1 * | 9/2022 | B05B 9/01 |
| WO | 2018157066 | A1 | 8/2018 | |

OTHER PUBLICATIONS

First Chinese Office Action for CN Application No. 202210189873.6, Dated Apr. 6, 2023, pp. 21.

International Search Report and Written Opinion for PCT Application No. PCT/US2024/017516, Dated Jun. 12, 2024, pp. 13.

* cited by examiner

ALIGNMENT TOOL FOR A SPRAY GUN

CROSS-REFERENCE TO RELATED APPLICATION(S)

This application claims the benefit of U.S. Provisional Application No. 63/449,820 filed Mar. 3, 2023 and entitled "ALIGNMENT TOOL FOR A SPRAY GUN," the disclosure of which is hereby incorporated by reference in its entirety.

BACKGROUND

The present disclosure relates generally to spray guns for spraying paint and other coatings.

Every time the tip or retaining ring assembly is removed from a spray gun, such as for cleaning, replacement, or other maintenance, the operator needs to re-align the tip. The alignment of the tip on an air assisted airless gun is a cumbersome process requiring multiple adjustments and rotations to facilitate proper alignment. The alignment can require multiple spray iterations to test the alignment to ensure that the tip is properly aligned. Precise orientation and alignment of the tip can be difficult for a variety of reasons. In particular, this is due to the fact that there are no reliable ways to indicate where the tip is orientated without performing a spray test.

Spray guns can be configured as automatic spray guns, in which spraying is remotely controlled, or manual spray guns, which are actuated to spray by an operator depressing a trigger. During spraying, a desired distance should be maintained between the spray gun and the target surface to provide a quality finish. During spraying with an automatic gun, the desired distance should be maintained to prevent the spray gun from contacting and potentially damaging the object being sprayed.

SUMMARY

According to one aspect of the disclosure, an alignment tool for adjusting an orientation of a spray pattern emitted by an air assisted airless spray gun includes a tool body extending between a first end and a second end, a first engagement surface disposed at the first end which at least partially defines a first opening configured to receive a first air horn of an air cap of the spray gun, and a second engagement surface disposed at the first end which at least partially defines a second opening configured to receive a second air horn of the air cap. The first engagement surface is configured to interface with the first air horn and the second engagement surface is configured to interface with the second air horn to exert a rotational force on the air cap about a spray axis through the air cap.

According to an additional or alternative aspect of the disclosure, an alignment system includes an air assisted airless spray gun configured to generate a fluid spray and an alignment tool. The air assisted airless spray gun includes a gun body and an air cap assembly mounted to the gun body which is configured to emit a fluid spray fan from a spray orifice and at a fan orientation. The air cap assembly includes an air cap having a first air horn extending axially from the air cap and spaced radially from the spray orifice and a second air horn extending axially from the air cap and spaced radially from the spray orifice, and an air cap housing connected to the gun body to secure the air cap to the gun body. The alignment tool is configured to extend over the air cap and engage with the first air horn and the second air horn to exert a rotational force on the air cap by the engagement between the alignment tool and the first air horn and second air horn to alter an angular position of the air cap and thereby alter the fan orientation.

According to another additional or alternative aspect of the disclosure, a method of adjusting an angular orientation of a spray pattern emitted by an air assisted airless spray gun includes connecting the air cap and a spray tip to the air assisted airless spray gun by an air cap housing extending over the air cap and engaging a gun body of the air assisted airless spray gun, engaging a first air horn of the air cap with an alignment tool, rotating the alignment tool about a spray axis to exert a rotational force on the air cap by the engagement between the first air horn and the alignment tool, and aligning an indicator formed on one of the alignment tool and the spray gun with one of a series of indicia formed on the other one of the alignment tool and the spray gun thereby orienting the spray tip to emit a spray fan at a desired fan orientation.

According to yet another additional or alternative aspect of the disclosure, an alignment tool for a spray gun includes a tool body extending about an axis and between a first end and a second end, the second end being open to accept a front end of the spray gun into a cavity defined by the tool body; and a path indicator supported by the tool body, the path indicator including a first projection extending outward away from the tool body.

According to yet another additional or alternative aspect of the disclosure, an alignment tool for a spray gun includes a tool body extending about an axis and between a first end and a second end, the second end being open to accept a front end of the spray gun into a cavity defined by the tool body; a tab supported connected to the tool body at an interface between the tab and the tool body, the tab supporting an inner protrusion extending inward from an inner side of the tab, the inner protrusion configured to engage the spray gun to mount the alignment tool on the spray gun; and a path indicator supported by the tool body, the path indicator including a first projection extending outward away from the tool body.

The present summary is provided only by way of example, and not limitation. Other aspects of the present disclosure will be appreciated in view of the entirety of the present disclosure, including the entire text, claims, and accompanying figures.

Figure 1A:
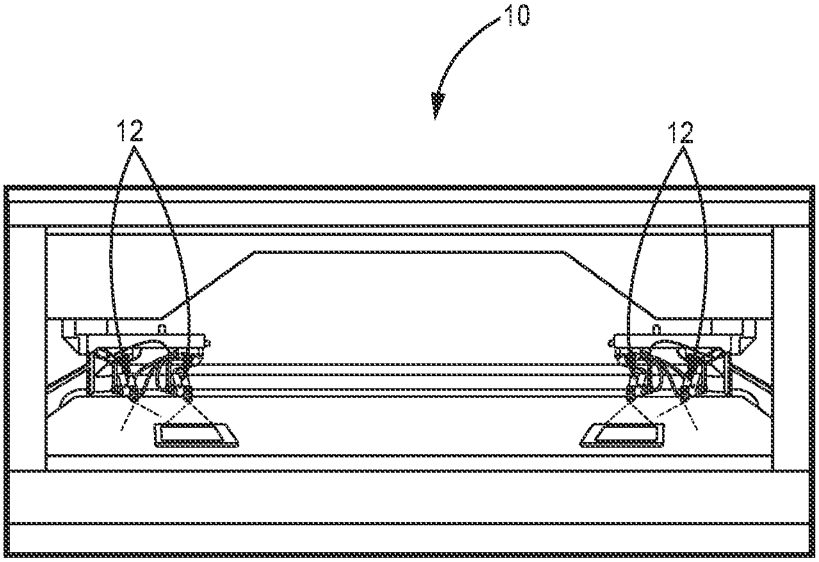
FIG. 1A is a perspective view of a spray machine containing multiple air assisted airless spray guns.

While the above-identified figures set forth one or more embodiments of the present disclosure, other embodiments are also contemplated, as noted in the discussion. In all cases, this disclosure presents embodiments by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features and components not specifically shown in the drawings.

DETAILED DESCRIPTION

The alignment tool of the present disclosure incorporates an indicator and a series of indicia and can interact with the air cap of a spray gun, such as an air assisted airless (AA) spray gun. The alignment tool can indicate the rotational position of the air cap horns and can have a feature which aligns with position demarcations. For example, the alignment tool can interface with the air cap of an AA spray gun to adjust the angle of the spray fan emitted by such a spray gun. An alignment tool with these corresponding position demarcations can allow the operator to easily and accurately align the air cap to a desired orientation.

Figure 1B:
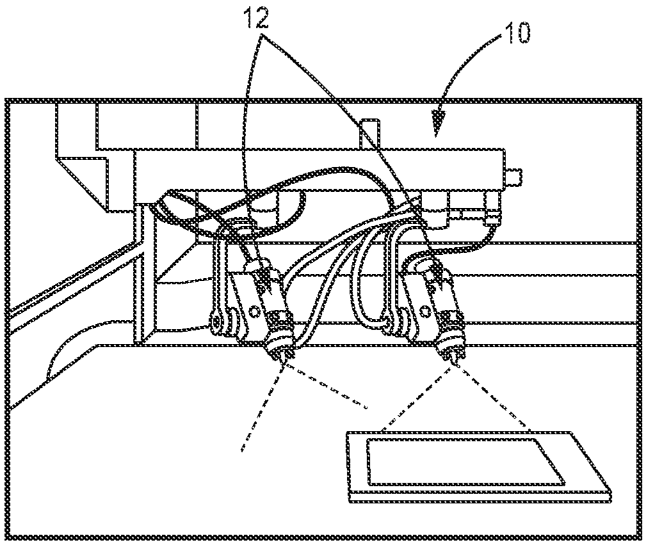
FIG. 1B is a perspective view of an air assisted airless spray gun assembly from FIG. 1A.

FIG. 1A is a perspective view of a spray machine 10 containing multiple spray guns 12. FIG. 1B is a perspective view of spray guns 12 spraying a surface. FIGS. 1A and 1B will be discussed concurrently. A fluid spraying machine, such as the spray machine 10 depicted in FIG. 1A, can have multiple spray guns 12, and each spray gun 12 can have a varied spray tip orientation to maximize uniformity of coverage and minimize product waste. Poor spray tip alignment can cause finishing defects such as haloing, which can require a sprayed surface to be sent through the spray machine 10 multiple times in order to achieve the desired coverage. Alignment tool 14 (discussed below and best seen in FIGS. 4A-4B) facilitates quick and efficient alignment of each spray tip, providing user confidence and reducing downtime by ensuring that all spray tips are properly aligned.

Figure 2:
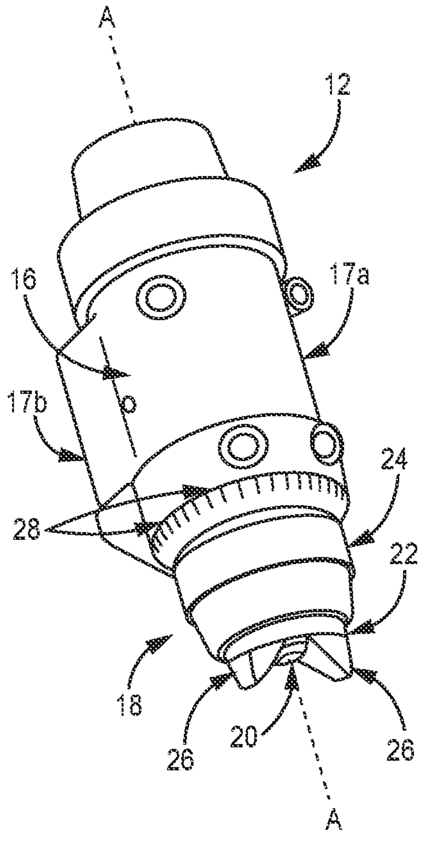
FIG. 2 is an isometric view of an air assisted airless spray gun.

FIG. 2 is an isometric view of spray gun 12. Spray gun 12 includes gun body 16, air cap assembly 18, and indicia 28. Air cap assembly 18 includes spray tip 20, air cap 22 and air cap housing 24. In the example shown, air cap 22 includes air horns 26. Air cap housing 24 can secure air cap 22 to gun body 16.

In the example shown, spray gun 12 is an automatic AA spray gun in that spray gun 12 can be operated automatically by a machine rather than directly by the user. It is understood that, in some examples, spray gun 12 can be a manual AA spray gun configured to be operated by a user. For example, spray gun 12 can include a handle configured to be grasped by the user and a trigger configured to be manipulated by the user to cause spraying by spray gun 12.

Gun body 16 is configured to receive flows of spray fluid and air. Gun body 16 supports other components of spray gun 12. Gun body 16 includes first side 17*a* and second side 17*b*. In the example shown, second side 17*b* is a flat and can form a mounting side of spray gun 12. For example, second side 17*b* can be mounted to a support, such as a support of the spray machine 10. First side 17*a* can be considered to be the top side and second side 17*b* can be considered to be the bottom side. In some examples, second side 17*b* is mounted to a support, such as a spray arm of a spray machine 10, such that second side 17*b* can be considered to be a support side of gun body 16. For example, a fastener, such as a bolt, screw, clasp, or other suitable fastener, can connect gun body 16 to the support.

Spray gun 12 is configured to emit an atomized spray of the spray fluid for application to a substrate. The spray fluid is emitted through a spray tip as the atomized fluid spray. Pressurized air is emitted through air cap 22 and is configured to interact with the atomized fluid spray to shape the pattern emitted from spray gun 12, such as by flattening or widening the fluid spray fan. Upstream fluid pressure can drive the spray fluid through the spray gun 12 and spray tip 20 at sufficient pressure to cause the atomization. As such, the atomized fluid spray can be generated airlessly while the shaping air emitted through air cap 22 assists in shaping the resulting spray pattern.

Air cap 22 is at least partially disposed within air cap housing 24. Air cap housing 24 is connected to gun body 16, such as by interfaced threading, among other options, and secures air cap 22 to gun body 16. Spray tip 20 is at least partially disposed within air cap 22 and is configured to emit the fluid spray. Spray tip 20 can include a spray nozzle 30 (shown in FIG. 3A) that atomizes the spray fluid. The spray nozzle 30 can shape the fluid spray. Spray gun 12 is configured to emit the fluid spray along spray axis A-A. The fluid spray is emitted in a pattern that is shaped by the shaping air. For example, the spray pattern can be a fan that is elongate orthogonal to spray axis A-A. Air horns 26 extend generally axially from the body of air cap 22. Air horns 26 are disposed on opposite lateral sides of spray tip 20.

Indicia 28 provide an indicator for the orientation of spray tip 20. Indicia 28 provide a visual indication of the orientation of spray tip 20, which orientation is formed relative to the long axis of the spray fan generated by spray tip 20. In the example shown, an array of marks is disposed around axis A-A to form indicia 28. In some examples, indicia 28 can include additional indicators, such as letters or numbers, to provide additional orientation information to the user. In the example shown, gun body 16 includes indicia 28. It is understood, however, that indicia 28 can additionally or alternatively be located on any desired portion of spray gun

10 suitable for orienting spray tip 20 relative to, such as, for example, on air cap housing 24, among other options.

Figure 3A:
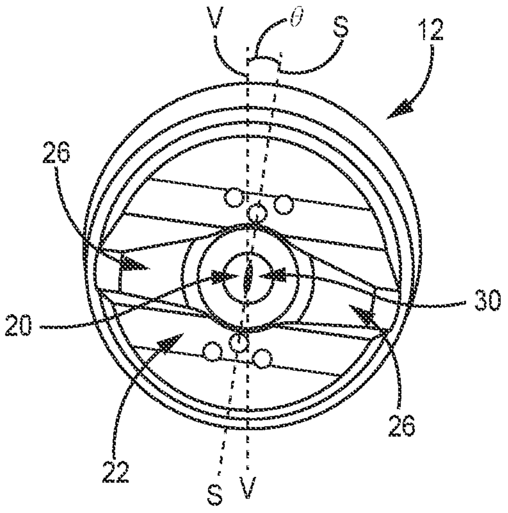
FIG. 3A is a front elevation view of a spray tip of the air assisted airless spray gun of FIG. 2.
Figure 3B:
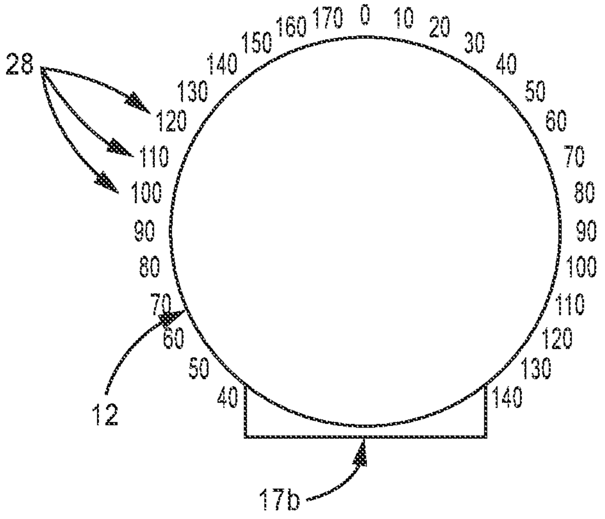
FIG. 3B is a schematic depiction of a series of indicia on a gun body of the air assisted airless spray gun of FIG. 2.

FIG. 3A is a front elevational view of air cap assembly 18. FIG. 3B is a schematic depiction of indicia 28 arranged about the circumference of spray gun 12. FIGS. 3A and 3B will be discussed together. Indicia 28 are configured to indicate an angular position of air cap 22 relative to spray gun 12. Indicia 28 can be formed on gun body 16 and/or air cap housing 24, among other locations on spray gun 12. In the example shown, indicia 28 includes a series of tick marks arranged at least partially about the circumference of gun body 16. Indicia 28 include angular indicators to provide the user a visual indication of the angular offset of the air cap 22.

Air cap housing 24 is connected to gun body 16 to secure air cap 22 to gun body 16. Air horns 26 extend axially with respect to air cap 22. Each air horn 26 is spaced radially from spray tip 20. Air cap housing 24 can extend over air cap 22 and is connected to gun body 16, thereby securing air cap 22 to gun body 16. Air cap 22 is rotatably connected to gun body 16 such that air cap 22 can be rotated about spray axis A-A and relative to gun body 16 while mounted to gun body 16 to change an orientation of spray nozzle 30. The orientation of spray nozzle 30 controls the orientation of the long portion of the spray fan. Air cap 22 and spray tip 20 may need to be removed from spray gun 12 in order to be cleaned, serviced, replaced, or otherwise undergo maintenance. For example, air cap housing 24 can be removed from gun body 16 and then air cap 22 and spray tip 20 can be removed. Air cap 22 and spray tip 20 are repositioned on spray gun 12 and secured on gun body 16 by air cap housing 24. However, spray nozzle 30 is typically misoriented relative to the desired spray orientation after spray gun 12 is reassembled. As such, the orientation of air cap 22, and thus of spray tip 20 and spray nozzle 30, requires adjustment to a desired spray orientation.

Spray tip 20 extends through air cap 22 and is configured to atomize a spray fluid such as paint, stain, or lacquer, among other options. Spray nozzle 30 is formed through spray tip 20 and is configured to emit the fluid. Spray tip 20 can spray in a fan-shaped spray pattern which can create a roughly oval spray pattern on a sprayed surface. For example, spray nozzle 30 can be of a cat-eye or other shaped aperture that emits an elongate spray fan. By rotating air cap 22, a range of fan orientations are possible for the spray pattern. Air cap 22 emits the shaping air while spray tip 20 emits the spray fluid.

Indicia 28 are configured to indicate the fan orientation of spray tip 20, where the fan orientation of spray tip 20 is defined by angular offset θ of air cap 22 relative to vertical plane V-V. Vertical plane V-V is oriented orthogonal to spray axis A-A, and angular offset θ can be in a clockwise or counterclockwise circumferential direction from vertical plane V-V. Vertical plane V-V defines a neutral position of air cap 22 such that when air cap 22 is in the neutral position, the fan orientation of spray tip 20 is oriented along vertical plane V-V. In the example shown, angular offset θ is set to 0 degrees when air cap 22 is in the neutral position such that the spray plane S-S and vertical plane V-V are co-planar. As discussed in more detail below, alignment tool 14 (best seen in FIGS. 4A-4C) is utilized to rotate air cap 22, and thus spray tip 20, about spray axis A-A to orient spray orifice 30 to a desired position. The starting position of air cap 22 can be, for example, the position air cap 22 is in following connection to gun body 16. Air cap 22 is rotated from the starting position to a desired spray position by the alignment tool 14 such that the angular offset θ is formed between the neutral and desired spray positions. With air cap 22 in the spray position, spray tip 20 is oriented to emit material along spray plane S-S.

It is understood that spray plane S-S in FIG. 3A is shown by way of example and that the desired spray plane S-S during operation can be of any desired orientation about spray axis A-A, including aligned with vertical plane V-V or offset from vertical plane V-V by any desired angular value. The spray fan plane S-S can be rotationally mirrorable about spray axis A-A. In such an example, rotating air cap 22, and thus spray tip 18, clockwise by a first angular offset relative to the vertical plane V-V results in the same spray pattern as rotating air cap 22 counterclockwise by a second angular offset relative to the vertical plane V-V, where the first and second angular offsets sum to 180-degrees. For example, rotating air cap 22 35-degrees Clockwise results in the same spray fan as rotating air cap 22 145-degrees Counterclockwise. Indicia 28 can also be rotationally mirrored to facilitate rotating air cap 22 in either rotational direction to align spray tip 20. Indicia 28 thereby facilitate quick and easy alignment of air cap 22 with less than a half turn in either rotational direction to align spray tip 20 for spraying.

Figure 4A:
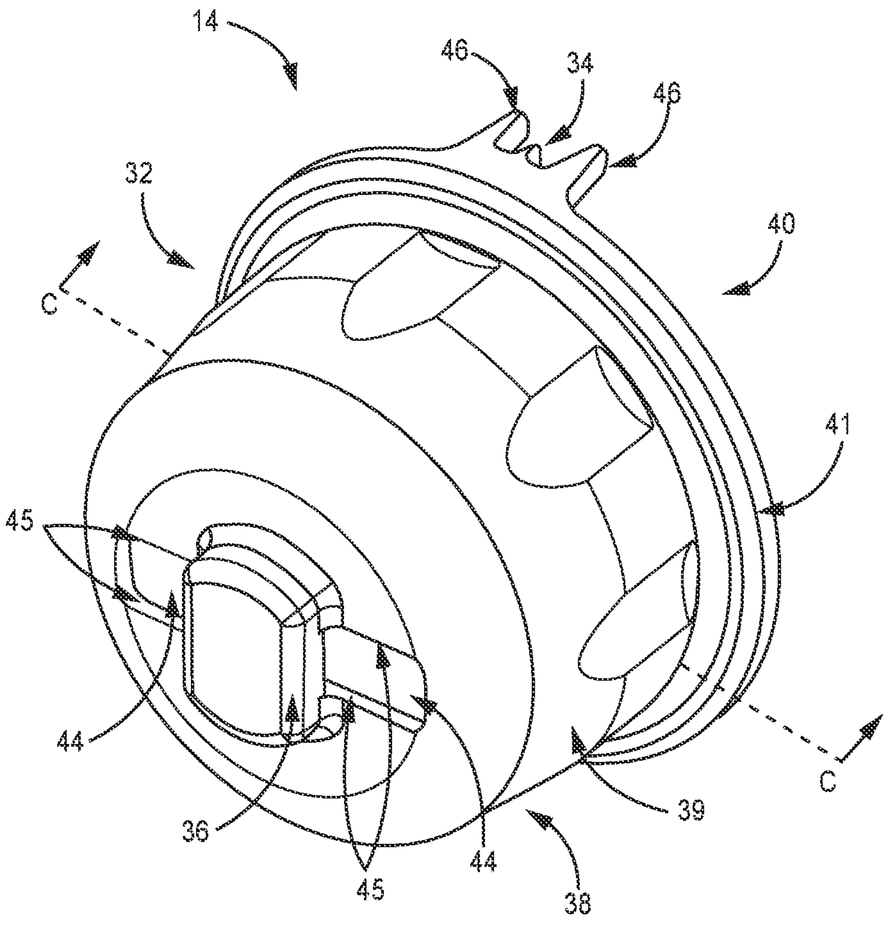
FIG. 4A is a top view of an alignment tool.
Figure 4B:
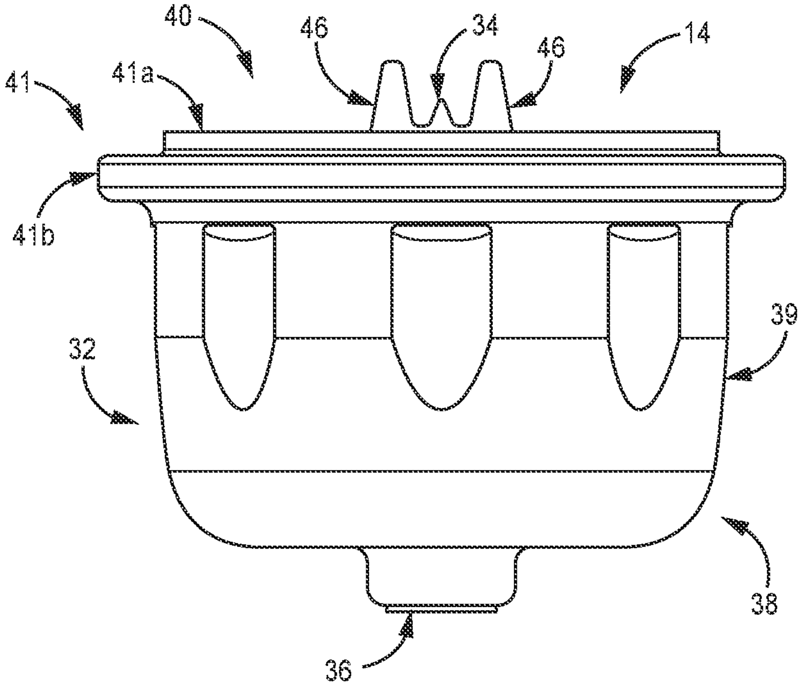
FIG. 4B is a front elevation view of the alignment tool of FIG. 4A.
Figure 4C:
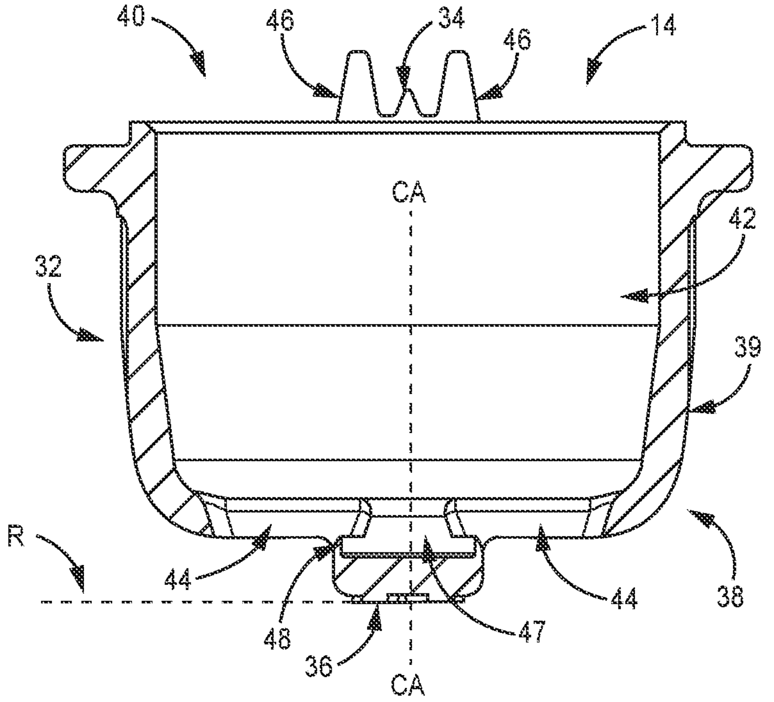
FIG. 4C is a cross-sectional view of the alignment tool taken along line C-C in FIG. 4A.

FIG. 4A is an isometric view of alignment tool 14. FIG. 4B is a top plan view of alignment tool 14. FIG. 4C is a cross-sectional view of alignment tool 14 taken along line C-C in FIG. 4A. FIGS. 4A-4C will be discussed together. Alignment tool 14 includes tool body 32, indicator 34, and end projection 36. Tool body 32 includes closed end 38, side wall 39, and open end 40.

Tool body 32 extends between a first end and a second end. In the example shown, the first end is closed end 38 and the second end is open end 40. It is understood, however, that the first end of tool body 32 and the second end of tool body 32 can be formed in any desired manner. In the example shown, alignment tool 14 is a cylindrical component, and tool body 32 includes an approximately circular circumferential side wall 39 between closed end 38 and open end 40. Side wall 39 can narrow towards closed end 38. Side wall 39 can include crenulations and/or other features, such as a knurled, grooved, or otherwise contoured surface, to facilitate gripping of alignment tool 14. Tool body 32 includes annular edge 41 defining the opening of open end 40. In the example shown, annular edge 41 contains radial flange 41*a* and axial flange 41*b*. Tool body 32 defines chamber 42 that is configured to receive at least a portion of air cap assembly 18 during alignment of the spray tip 22. Alignment tool 14 can be additively manufactured and can be, for example, formed of a material such as nylon which does not chemically interact with fluids such as paint or solvents.

Alignment tool 14 includes horn receiving openings 44 formed in closed end 38. Each horn receiving opening 44 is at least partially defined by engagement surfaces 45 and is able to receive an air horn 26. Each air horn 26 can extend at least partially through a corresponding horn receiving opening 44 when alignment tool 14 is mounted on air cap housing 24. When air horn 26 extends through horn receiving opening 44, the engagement surfaces 45 are disposed adjacent to circumferential sides of air horns 26, as best seen in FIGS. 5A-6B. Engagement surfaces 45 are configured to directly contact air horns 26 and exert a rotational force on air horns 26 to rotate air cap 22 about spray axis A-A. The air horns 26 extend through the horn receiving openings 44 through closed end 38. In the example shown, horn receiving openings 44 extend through the closed end 38 such that horn receiving openings 44 are enclosed openings. As such, horn receiving openings 44 are axially open to allow air horns 26 to extend through openings 44, but horn receiving openings 44 are closed on the radial/circumferential sides.

Indicator 34 is an axial projection of alignment tool 14 and can contain a pointed tip which extends axially from radial flange 41*a* of annular edge 41 adjacent to open end 40. Indicator 34 extends axially beyond open end 40 and away from closed end 38. In the example shown, alignment tool 14 also includes indicator guards 46 on either circumferential side of indicator 34. In the example depicted, indicator guards 46 are axial projections which extend from radial flange 41*a* of annular edge 41. Indicator 34 and each indicator guard 46 have a respective axial length that is defined by the axial distance from radial flange 41*a* to the distal end of each axial projection away from radial flange 41*a*. Indicator guards 46 have a larger axial length than indicator 34. Indicator guards 46 are configured to protect indicator 34 from damage. For example, if alignment tool 14 is dropped, indicator guards 46 will contact any surface prior to indicator 34 contacting the surface, preventing undesired contact damage that could cause a deformation to indicator 34.

End projection 36 extends from closed end 38 of alignment tool 14. End projection 36 extends axially away from closed end 38 and can be disposed between horn receiving openings 42. End projection 36 can be bracketed by horn receiving openings 44. In the example shown, end projection 36 defines a blocking chamber 47 that is axially aligned with spray orifice 30 of air cap assembly 18 when alignment tool 14 is mounted to spray gun 12. Blocking chamber 47 is spaced from spray orifice 30 when alignment tool 14 is mounted to spray gun 12. End projection 36 and blocking chamber 47 protect the user from a discharge of paint or other material if spray gun 12 is triggered while alignment tool 14 is mounted on air cap 22. In the embodiment shown, end projection 36 includes projection openings 48 that extend at least partially along the side walls of end projection 36 that are adjacent horn receiving openings 44. The projection openings 48 and horn receiving opening 44 together define the horn receiving apertures through which air horns 26 extend. In the example shown, projection openings 48 and horn receiving openings 44 are defined by a contiguous removal of material such that a single aperture defines both a horn receiving opening 44 and an adjacent projection opening 48. Projection openings 48 extend axially relative to radial line R projecting relative a center axis CA of alignment tool 14. The center axis CA can be configured to be aligned with the spray axis A-A when alignment tool 14 is mounted to spray gun 12. The projection opening 48 extends axially between an intersection with horn receiving opening 44 and the opposite end of the projection opening 48. In the example shown, projection openings 48 extend both axially and radially. In the event that spray gun 12 is triggered while alignment tool 14 is mounted, the resulting spray enters blocking chamber 47 and is emitted through projection openings 48. The output pressure is dissipated to prevent injection or other injuries from occurring.

Figure 5A:
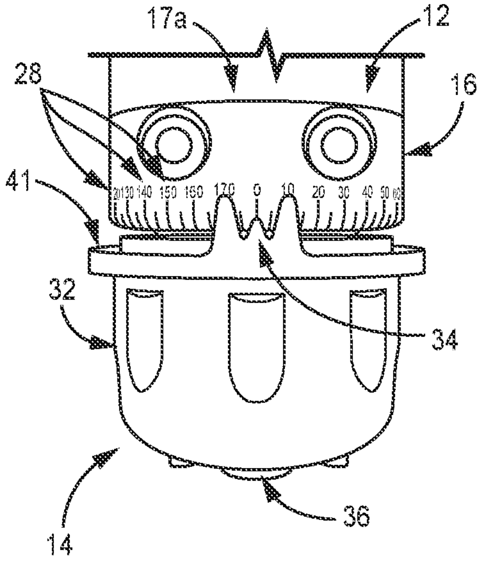
FIG. 5A is a top plan view showing an alignment tool mounted to an air assisted airless spray gun with an air cap of the air assisted airless spray gun oriented in a starting position.
Figure 5B:
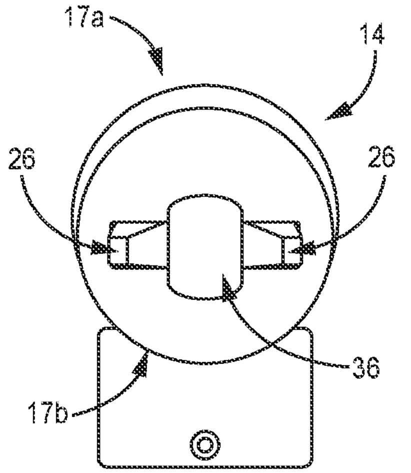
FIG. 5B is a front elevation view showing the alignment tool mounted to the air assisted airless spray gun with the air cap in the starting position of FIG. 5A.
Figure 6A:
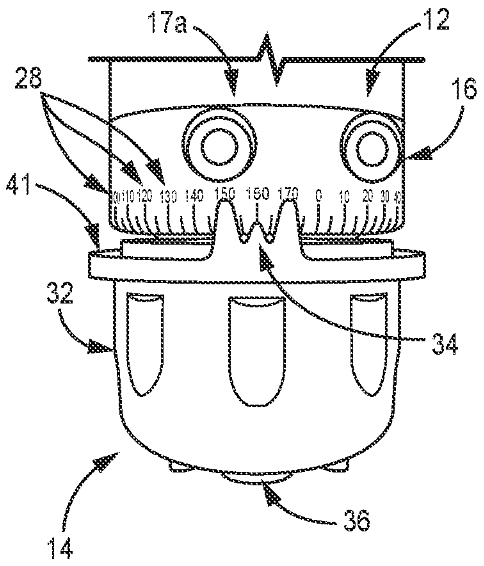
FIG. 6A is a top plan view of the alignment tool mounted to the air assisted airless spray gun of FIG. 5A with the air cap adjusted to a desired spray position.
Figure 6B:
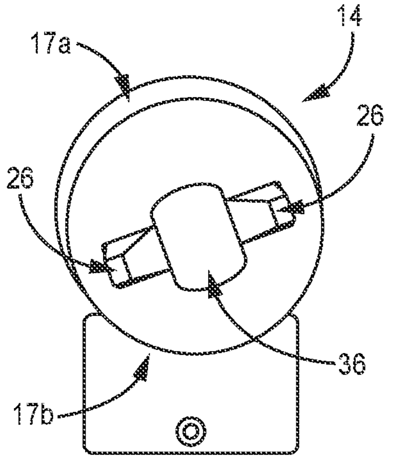
FIG. 6B is a front elevation view of the airless air assisted spray gun with the alignment tool mounted to the spray gun and with the air cap in the desired spray position of FIG. 6A.

FIG. 5A is a top plan view showing alignment tool 14 mounted to air cap assembly 18 with air cap 22 in a starting position. FIG. 5B is a front elevation view showing alignment tool 14 mounted to air cap assembly 18 with air cap 22 in the starting position. FIG. 6A is a plan view showing alignment tool 14 mounted to air cap assembly 18 with air cap 22 in a desired spray position. FIG. 6B is a front elevation view showing alignment tool 14 mounted to air cap assembly 18 with air cap 22 in the desired spray position. FIGS. 5A-6B will be discussed together. Gun body 16 and indicia 28 are shown. Tool body 32, indicator 34, end projection 36, horn receiving openings 44, and engagement surfaces 45 of alignment tool 14 are shown. Air horns 26 of air cap 22 are shown.

Alignment tool 14 is configured to adjust the orientation of air cap 22, and thus the orientation of the spray plane S-S of the spray orifice 30 (shown in FIG. 3A) about the spray axis A-A. Air cap 22 and spray tip 20 may need to be removed from spray gun 12 in order to be cleaned, serviced, replaced, or otherwise undergo maintenance. This maintenance allows a new air cap 22 to be connected to spray gun 12. It should be noted that the “new” air cap is so named to differentiate it from the air cap in the state in which it is removed from the spray gun. The new air cap can be, for example, a previously unused air cap, a refurbished air cap, or the original air cap which has been cleaned, been refurbished, or otherwise undergone maintenance. Once air cap 22 is connected to spray gun 12, spray tip 20 is in a starting position. Alignment tool 14 can then be mounted to spray gun 12 to align spray tip 20 to a desired spray position.

During use of alignment tool 14, alignment tool 14 is mounted to spray gun 12 to directly interface with air cap 22. Alignment tool 14 can, in some examples, fully enclose and cover air cap 22. For example, alignment tool 14 can include enclosed projections for receiving air horns 26. In the example shown, alignment tool 14 partially encloses air cap 22 with air horns 26 extending through horn receiving openings 44. Alignment tool 14 can mount to air cap housing 24 of spray gun 12 as shown in FIGS. 5A-6B. In some embodiments, alignment tool 14 can be removably mounted to air cap housing 24, while in other embodiments alignment tool 14 can be integrated with air cap housing 24. Alignment tool 14 can be used during the alignment of spray tip 20, after spray tip 20 and air cap 22 have been attached to spray gun 12.

Alignment tool 14 is configured to engage air cap 22 and reposition spray tip 20 at any desired angle by rotating air cap 22 about spray axis A-A. In the example shown, alignment tool 14 interfaces with air horns 26 to engage with air cap 22. The interface between alignment tool 14 and air cap 22 can be achieved by direct or indirect contact between alignment tool 14 and air horns 26. Tool body 32 of alignment tool 14 can cover and receive air cap 22. In the example shown, alignment tool 14 receives air cap housing 24 within chamber 42 of alignment tool 14. The rotation of alignment tool 14, and the resulting torque exerted on air cap 22 to cause rotation of air cap 22, can occur in either a clockwise or counterclockwise circumferential direction with respect to spray axis A-A. After this rotation, spray tip 20 is oriented in a desired spray position, and during use of spray gun 12 the fan orientation of the spray fluid will correspond to the desired spray position of spray tip 20. The angular offset θ achieved by this rotation is indicated by indicia 28. In the example depicted in FIGS. 6A-6B, the alignment tool has been rotated in a counterclockwise circumferential direction.

The user can visually confirm the orientation of air cap 22 based on the position of indicator 34 relative to indicia 28. In the example shown, indicia 28 include numerals indicating the angular offset from vertical plane V-V, which vertical plane is indicated by the “0” or neutral one of indicia 28. The user rotates alignment tool 14 until indicator 34 is aligned with the indicia 28 associated with the desired spray orientation. The air cap 22 and spray tip 20 are thus placed in the rotational positions associated with the desired spray position. Spray tip 20 is thereby aligned to emit the spray pattern at the desired orientation.

In the example shown, alignment tool 14 is removably mounted to spray gun 12, and can be removed from spray gun 12 after spray tip 20 is oriented at the desired spray position. It is understood, however, that alignment tool 14 can interface with spray gun 12 in any desired manner suitable for quickly and efficiently manipulating an angular orientation of the air cap 22 to a precise, desired angular orientation. For example, the interface can include one or more of a click knob, a spring-loaded connection, clocked threads on a retaining ring of air cap housing 24, or another desired interface. In some examples, alignment tool 14 can be integrated with spray gun 12. This can be achieved by incorporating indicia onto air cap housing 24 and including indicating features on a non-removable part, incorporating the indicating features onto air cap assembly 18 or a retaining ring, or other locations on spray gun 12.

Alignment tool 14 provides significant advantages. Alignment tool 14 engages with air cap 22 to exert torque on air cap 22 and alter the angular position of air cap 22. Alignment tool 14 further provides a visual indication of the angular position. Alignment tool 14 thereby facilitates quick and easy alignment of spray tip 20 into a desired position for spraying. Air cap 22 does not need to be adjusted multiple times through a trial and error process and can instead be aligned quickly and efficiently by alignment tool 14. Alignment tool 14 thereby reduces downtime, increases operational efficiency, and reduces costs and material waste. Alignment tool 14 can additionally prevent user injuries by blocking fluid spray while alignment tool 14 is mounted on spray gun 12.

Figure 7:
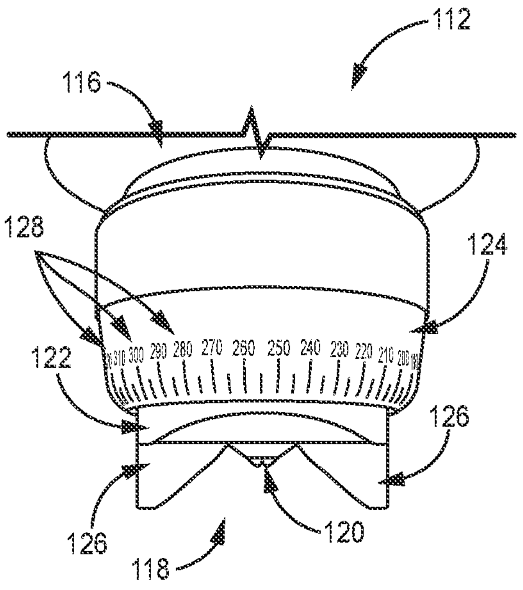
FIG. 7 is an isometric view of another embodiment of an air cap of an air assisted airless spray gun.

FIG. 7 is a top elevation view of air cap assembly 118 of spray gun 112. Spray gun 112 includes gun body 116 and air cap assembly 118. Air cap assembly 118 includes spray tip 120, air cap 122, and air cap housing 124. In the example shown, air cap 122 includes air horns 126. Air cap housing 124 can secure air cap 122 to gun body 116.

Spray gun 112 is substantially similar to spray gun 12, differing primarily in the location of indicia 128, which are substantially similar to indicia 28. Air cap housing 124 of spray gun 112 includes indicia 128. Indicia 128 are configured to indicate an angular position of air cap 122 relative to gun body 116. In the example shown, indicia 128 includes a series of tick marks arranged at least partially about the circumference of air cap housing 124. As in the embodiment described in FIGS. 2-3, indicia 128 include angular indicators to provide the user a visual indication of the angular offset of air cap 122. An alignment tool, such as alignment tool 14 described above (best seen in FIGS. 4A-4C) can be configured to engage air horns 126 and have an indicator 34 interfacing with indicia 128. The alignment tool can extend only partially axially such that the alignment tool axially overlaps with up to a portion of air cap housing 124. The use of an alignment tool with spray gun 112 provides substantially the same advantages as described above.

Figure 8:
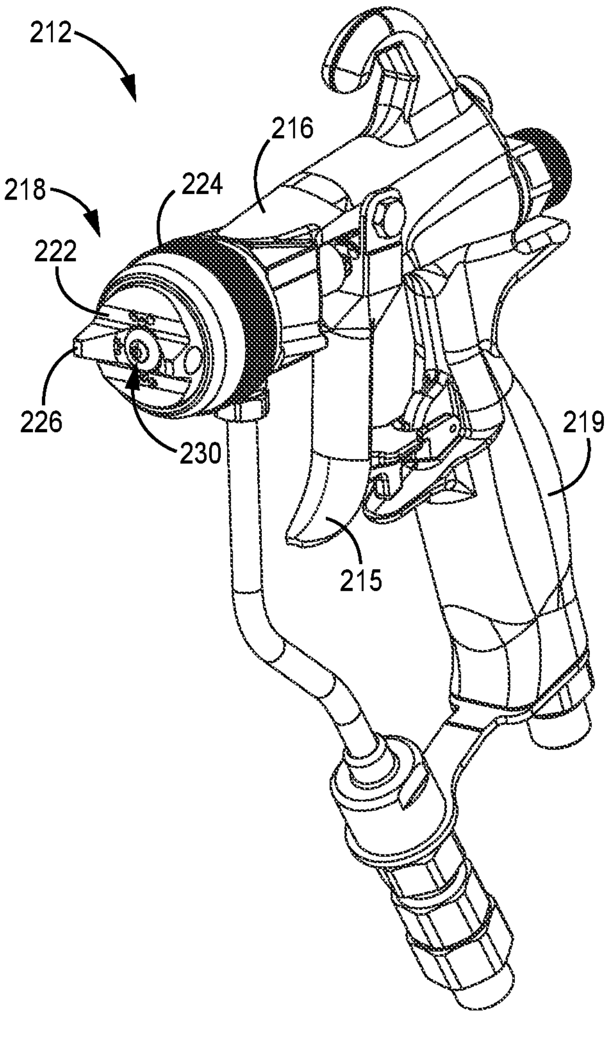
FIG. 8 is an isometric view of a manual spray gun.

FIG. 8 is an isometric view of a manual spray gun 212. Manual spray gun 212 is operated by depressing a trigger 215 supported by a body 216 of the spray gun 212. The user can grasp the gun handle 219 by a single hand of the user to manipulate the orientation of manual spray gun 212 and cause spraying by manual spray gun 212. Depressing the trigger 215 opens a spray valve within the body 216 to release the spray liquid from the nozzle 230 of the spray gun 212. Depressing the trigger 215 can, in examples including air cap assemblies, direct compressed air to the air cap 222 for emission from the spray gun 212. Air cap assembly 218, including cap housing 224 and air cap 222, is supported by gun body 216.

Figure 9:
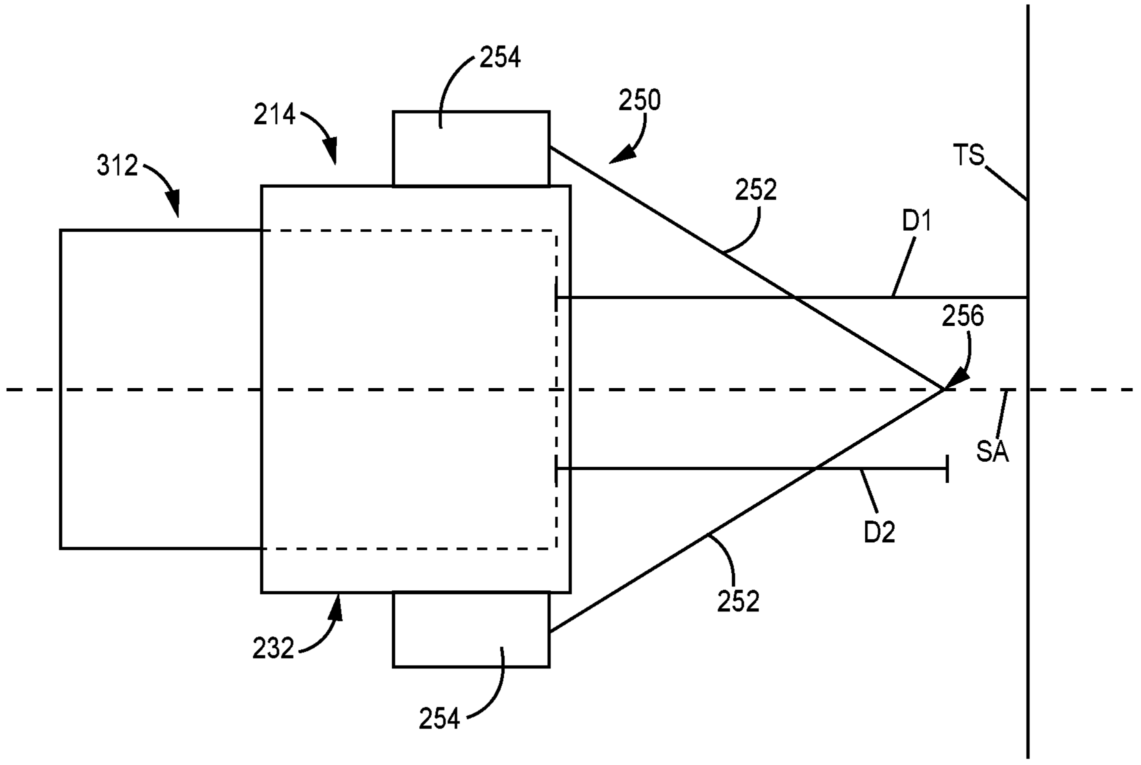
FIG. 9 is a schematic diagram of an alignment tool disposed on a spray gun.

FIG. 9 is a schematic block diagram showing alignment tool 214 with path indicator 250 disposed on spray gun 312. Alignment tool 214 is substantially similar to alignment tool 14 (best seen in FIGS. 4A-4C) and alignment tool 214 can include the same features as alignment tool 14, such as for aligning an air cap for a desired spray pattern orientation. Alignment tool 214 further includes path indicator 250 that provide orientation and feedback for operation of the spray gun 312 that alignment tool 214 is utilized on. The alignment tool 214 is substantially similar to alignment tool 14 and reference numbers of alignment tool 214 are increased by "200" relative to similar/same components of alignment tool 14. Alignment tool 214 is mounted on a spray gun 312, which can be an automatic spray gun (similar to spray gun 12 (FIG. 2) or spray gun 112 (FIG. 7)) or a manual spray gun (similar to spray gun 212 (FIG. 8)).

Path indicator 250 is disposed on an exterior of tool body 232 of alignment tool 214. Path indicator 250 can provide feedback regarding spacing between the spray gun 312 and the target object. Path indicator 250 is configured to provide an indication of a distance between the spray gun 312 and a target surface TS. During spraying, it is desirable to have a gap distance D1 of a consistent width between the spray gun 312 and the target surface TS to provide a consistent, high-quality finish. The feedback provided by path indicator 250 can provide an indication of the actual gap distance D1 between the spray gun 312 and the target object prior to actual conducting spray operations. Such feedback can be useful in an automatic spray operation to provide proper pathing for the automatic sprayer and positioning of the target object within the spray booth. Such feedback can be useful in manual spray operation to provide training for obtaining and maintaining the desired gap distance during spraying.

In some examples, alignment tool 214 is disposed on an automatic spray gun 312, which is oriented by a machine during operation. The path indicator 250 provides feedback to the operator regarding the proposed toolpath of the spray gun 312 relative to the target object (e.g., target surface TS) prior to an actual spray event. The feedback provided by path indicator 250 can prevent undesirable contact between the spray gun 312 and the target surface TS of an object to be sprayed by ensuring desired spacing prior to a spray event as such contact can damage the object and/or the spray gun 312.

The feedback can also be useful on manual spray guns 312 that are held in the hand of a user. For manual spray guns, an operator is trained to maintain the desired gap distance D2 between the nozzle and the target surface TS during spraying to provide a coating having desired pattern, thickness, finish quality, etc. The feedback provided by path indicator 250 can inform the operator of the actual distance that they are maintaining between the spray gun 312 and the target surface TS. The path indicator 250 provide feedback without spraying any fluid from the spray gun 312, saving on materials and costs during training of the operator and providing for a cleaner training environment.

Path indicator 250 can be configured to provide feedback in any desired manner. For example, path indicator 250 can be configured to provide visual feedback, audio feedback, etc. In the example shown, path indicator 250 includes projections 252 that extend outward relative to tool body 232. Projections 252 extend axially outward away from tool body 232. Projections 252 extend outward to provide information regarding the gap distance D1. The actual gap distance D1 is the true distance between spray gun 312 and target surface TS. The desired gap distance D2 is the gap distance indicated by projections 252. The desired gap distance D2 is the gap distance desired during spray operations. In the example shown, the desired gap distance D2 is indicated at the intersect location 256 between projections 252, though it is understood that not all examples are so limited.

Path indicator 250 can be formed as one or more physical projections 252 that extend from alignment tool 214 and away from sprayer 312. The projections 252 can be configured to converge to meet at an intersect location 256 in front of the nozzle of the sprayer 312. The intersect location 256 can be disposed coaxial with the spray axis SA of the spray gun 312, among other positioning options. In some examples, the intersect location 256 provides the desired gap distance D2, which is the gap distance as indicated by the path indicator 250. In some examples, the path indicator 250 includes a further projection extending axially away from the tool body 232 and intersect location 256, and in such an example the distal end of the further projection can indicate the desired gap distance D2.

The projections 252 can indicate the desired distance for application of the spray fluid on the target surface TS. The physical projections contacting a workpiece, such as with alignment tool 214 mounted on an automatic sprayer, can visually indicate such contact to the user and can, in some examples, cause the projections 252 to snap back to position after passing over the workpiece, providing audio feedback to the user. The physical projections 252 provide a visual indication to the user during training with a manual spray gun 312 to indicate the actual distance that the user is maintaining.

In some examples, the path indicator 250 can be light-based. For example, path indicator 250 can include one or more laser diodes emitting a very narrow coherent low-powered laser beam of visible light, the light beam forming the projection 252. In one example, path indicator 250 can include multiple projections 252, such as two, three, four, or more, oriented to have the multiple light beams converge at an intersect location 256 indicating the desired gap distance D2. Such projections 252 can be angled to project light beams inward towards the spray axis SA. The path indicator 250 can be oriented such that the intersect location 256 between the multiple light beams is aligned on the spray axis SA, among other options. The convergence of the multiple light beams indicates the desired gap distance D2 to the operator, such as for toolpathing of an automatic sprayer and/or training for a manual spray gun 312.

The path indicator 250 can, in some examples, be manipulated to reorient the projections 252 for larger or smaller desired gap distances D2. For example, projections 252 can be manipulated such that intersect location 256 is closer to tool body 232, providing a smaller desired gap distance D2, or such that intersect location 256 is further from tool body 232, providing a larger desired gap distance D2.

In physical projection 252 examples, the projections 252 can be mounted to be movable along the spray axis SA to be closer to or further from the nozzle 230. For example, multiple of the projections 252, such as two, three, four, or more, can extend from the alignment tool 214 and converge together at intersect location 256. The projections 252 can shift along the spray axis SA relative to tool body 232 to adjust the size of the desired gap distance D2 indicated by alignment tool 214. For example, projections 252 can retract into or extend from the tool body 232 to adjust the desired gap distance D2. In some examples, the projections 252 can be configured as telescoping projections in which a first part can be retracted into or extended from a second part to change an axial length of the projection 252. In some examples, the physical projections can pivot to change the desired gap distance D2.

The projections 252 and/or supporting portions of the tool body 232 can include indicators (e.g., numerical indicators, etc.) that provide information regarding the actual size of the desired gap distance for an associated position of the projections 252. For example, a physical projection 252 can include marks indicating various distances depending on the position of the projection 252 relative to the tool body 232 (e.g., indicating shorter distances when retracted and longer distances when extended). Light-based projections 252 can include marks that indicate the actual size of the desired gap distance D2 depending on the orientation of the light beam. For example, the light source can be movably mounted, such as on a pivot, and indicator marks can be provided on the movable light source and/or the static supporting structure to provide an indication of the actual size of the desired gap distance D2 associated with the particular orientation of the light-based projection 252. For example, the desired gap distance D2 will increase as the light source is pivoted outward away from tool body 232 so the light beam extends further along the spray axis SA and the desired gap distance D2 will decrease as the light source is pivoted inward towards the tool body 232 so the light beam extends less distance along spray axis SA before intersecting with spray axis SA.

In some light-based indicator examples, the path indicator can be configured to project a visual indication of the anticipated spray pattern on the target surface. For example, multiple laser diodes can be oriented to project the anticipated pattern and such that the pattern narrows with a smaller gap distance and widens with a greater gap distance. Such path indicator 250 can be include one or more retainers 254 angled to project the light beam projection 252 away from or along the spray axis SA. Such a pattern indication can be particularly useful for training with manual sprayers 212 to provide a visual indication of the anticipated pattern shape and size.

In some examples, the light source can be configured as a distance sensor that emits a beam (e.g., optical or audio) and generates data based on reflection time back to the path indicator 250. In such an example, data regarding the actual gap distance D1 can be generated based on the distance information generated by the path indicator 250. Path indicator 250 can be configured as a transmitter or transceiver to wirelessly transmit the distance data to a computer-based controller having a processor and computer memory that generates the distance data based on the distance information from the path indicator 250. In such an example, the path indicator 250 can be mounted on alignment tool 214 coaxial with the spray axis SA, among other mounting location options.

Figure 10A:
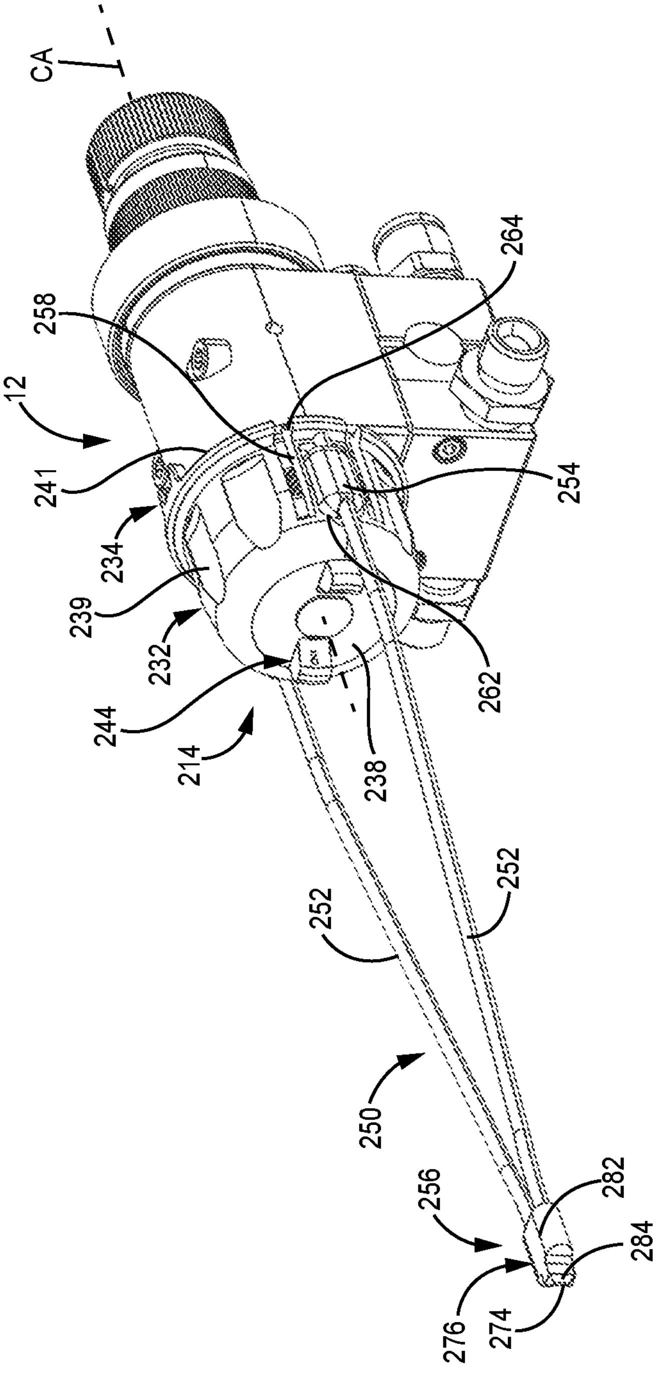
FIG. 10A is an isometric view showing an alignment tool mounted on an automatic spray gun.
Figure 10B:
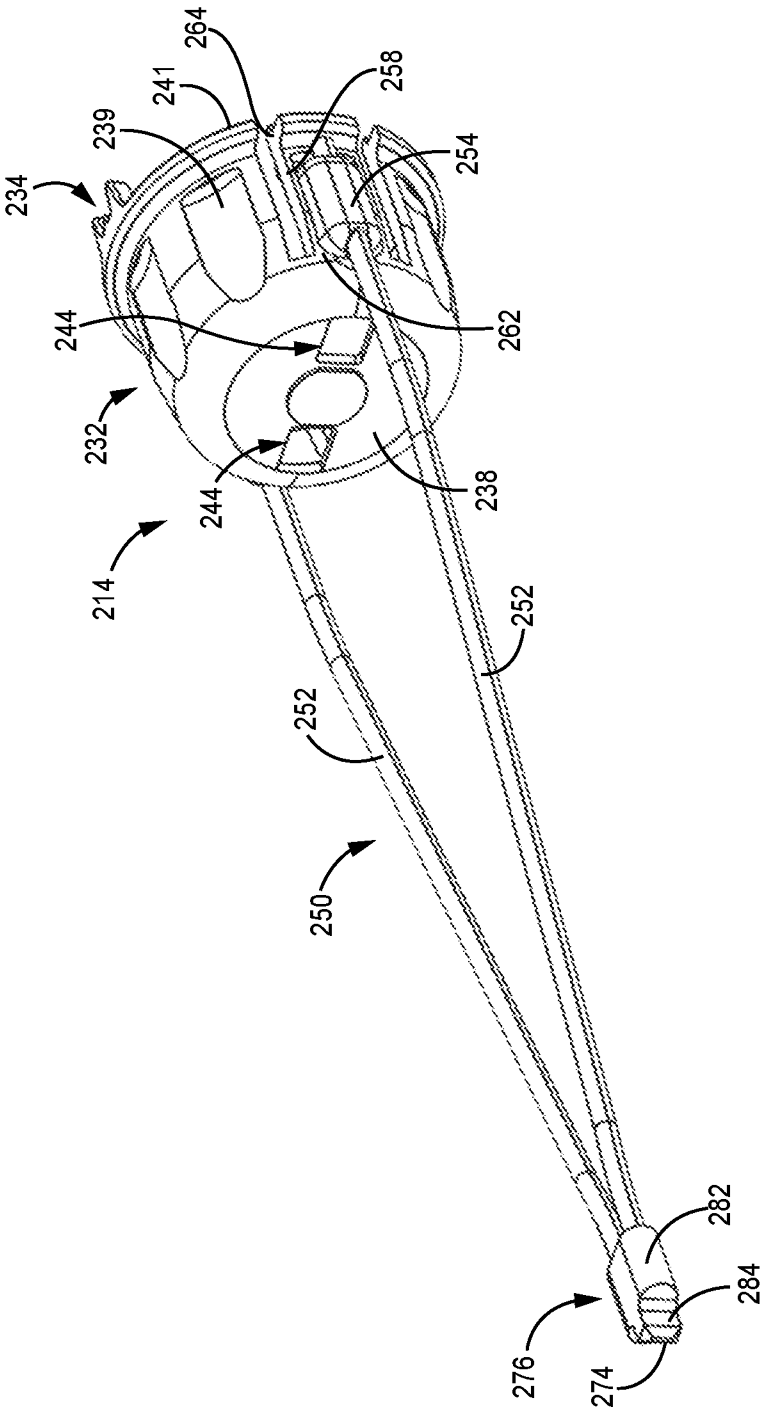
FIG. 10B is a first isometric view of the alignment tool.
Figure 10C:
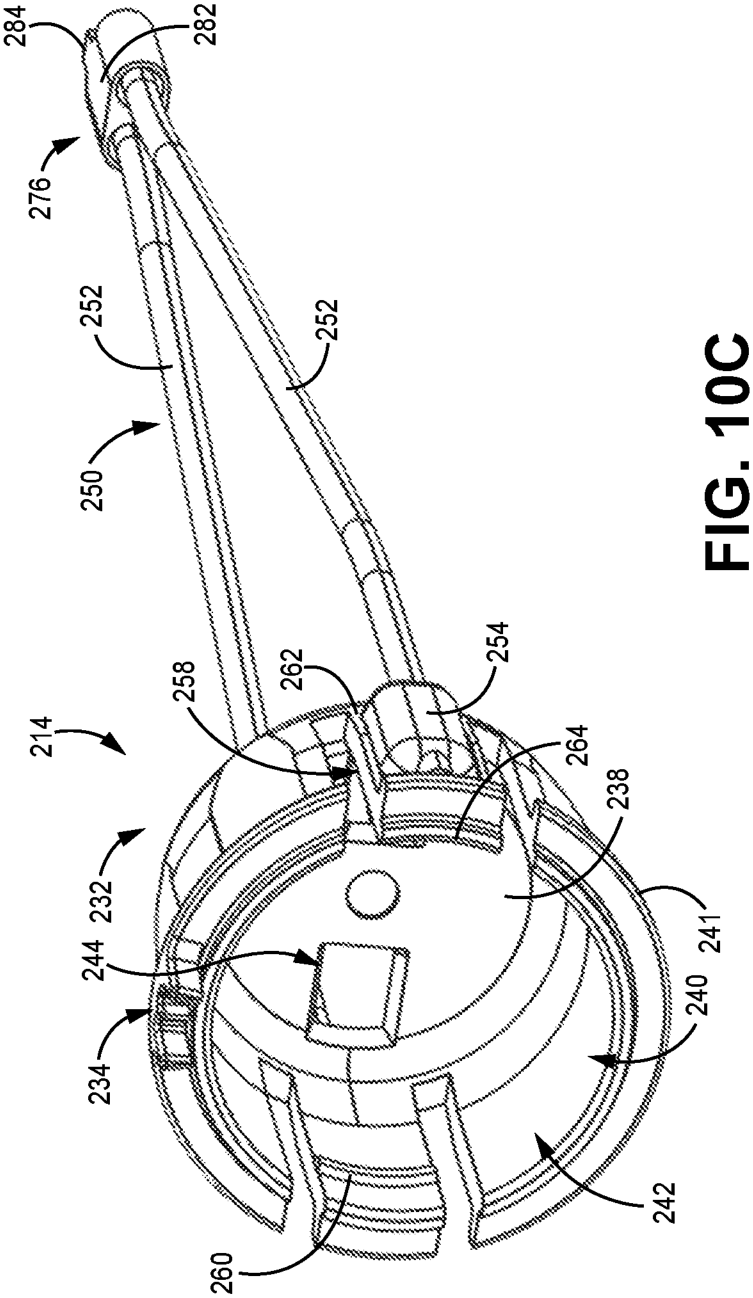
FIG. 10C is a second isometric view of the alignment tool.
Figure 10D:
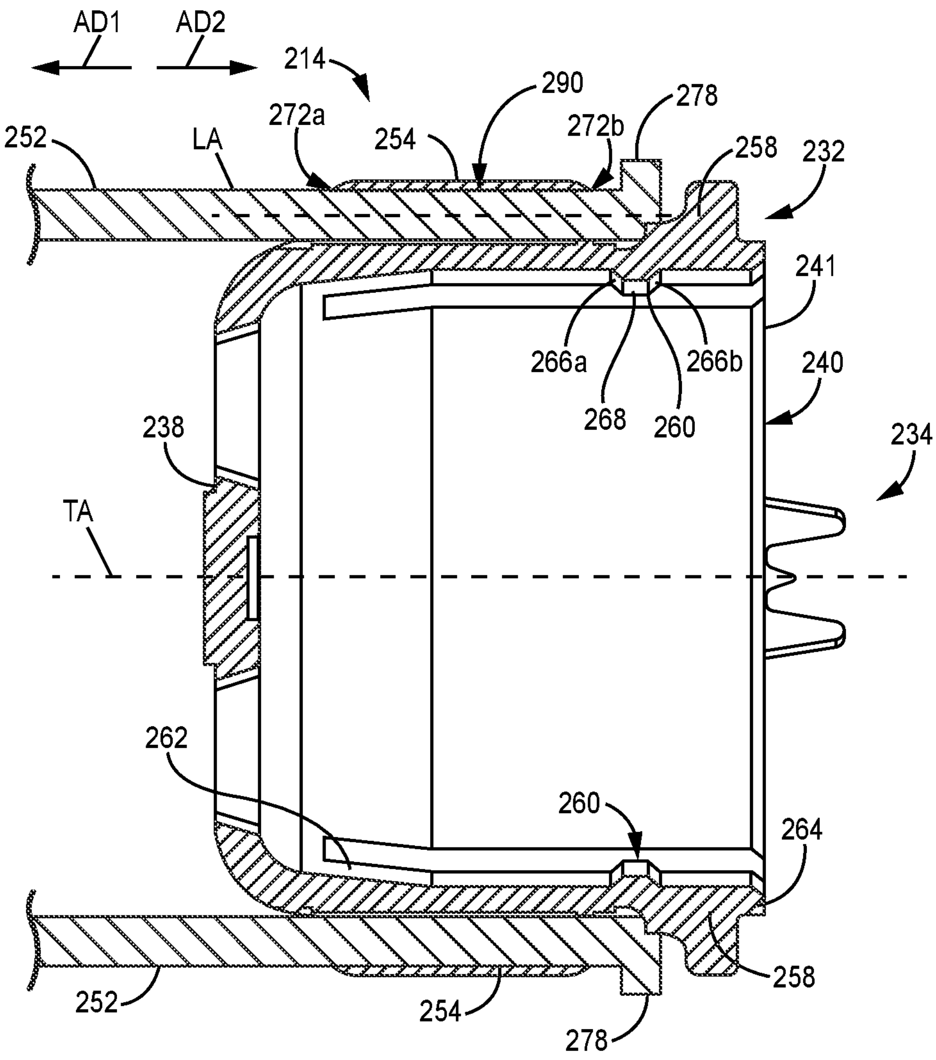
FIG. 10D is a cross-sectional view taken along line D-D in FIG. 10B.

FIG. 10A is an isometric view of alignment tool 214 mounted on an automatic spray gun 12. FIG. 10B is a first isometric view of alignment tool 214. FIG. 10C is a second isometric view of alignment tool 214. FIG. 10D is a cross-sectional view of alignment tool 214 taken along line D-D in FIG. 10B. FIGS. 10A-10D will be discussed together. Alignment tool 214 includes tool body 232, annular edge 241, receiving openings 244, path indicator 250, tabs 258, inner protrusions 260, and retainers 254. Tool body 232 includes closed end 238, side wall 239, and open end 240.

Alignment tool 214 is substantially similar to alignment tool 14 (best seen in FIGS. 4A-4C) in that alignment tool 214 can be mounted over an air cap (e.g., air cap 22, air cap 122, air cap 222) such that the air horns extend within and through receiving openings 244. Alignment tool 214 can then be rotated to adjust an orientation of the air cap. For example, alignment tool 214 can engage with air horns 226 of the air cap 222 to exert the rotational force on the air cap 222. The alignment tool 214 shown includes indicator 234, similar to indicator 34 of alignment tool 14, to provide visual feedback to the user regarding the orientation of the air cap 222 about the spray axis SA. While alignment tool 214 is shown as including indicator 234, it is understood that not all examples are so limited.

Alignment tool 214 is configured to secure to a spray gun 312, automatic or manual, such that alignment tool 214 can remain mounted on and supported by the spray gun 312 when released by the user. Tool body 232 is configured to extend over and at least partially enclose portion of the spray gun 312 with alignment tool 214 mounted on spray gun 312. Tool body 232 extends along tool axis TA. Tool axis TA can be disposed coaxially with spray axis SA with alignment tool 214 mounted on spray gun 312.

Tabs 258 are formed on tool body 232. Tabs 258 are formed by portions of side wall 239 in the example shown. Tabs 258 are connected to tool body 232 at side wall 239. In the example shown, each tab 258 is connected to side wall 239 at a location intermediate closed end 238 and open end 240 and tabs 258 project towards open end 240. In the example shown, tabs 258 project such that free ends 264 of tabs 258 form a portion of the annular edge 241 of alignment tool 214. It is understood, however, that not all examples are so limited. For example, annular edge 241 can be formed as a solid ring with free end 264 recessed from and spaced in first axial direction AD1 from the structure forming annular edge 241.

Tabs 258 are cantilevered such that tabs 258 include a connected end 262 at the interface with tool body 232 and a free end 264 opposite the connected end 262. In the example shown, the interface between tab 258 and tool body 232 is formed between tab 258 and side wall 239. Tab 258 projects towards open end 240 in the example shown. Tab 258 projects in second axial direction AD2 from the tool body 232 to the free end 264 of the tab 258. It is understood that tab 258 can, in some examples, project in first axial direction AD1 from the connected end 262 to the free end 264. For example, tab 258 can be connected to tool body 232 at or near open end 240 such that free end 264 is disposed between closed end 238 and open end 240. The connected end 262 can form part of annular edge 241 in such an example.

Tabs 258 are configured to flex as alignment tool 214 is mounted on and dismounted from spray gun 312. Tabs 258 are configured to engage with portions of spray gun 312, such as cap housing 224 of air cap 222, with alignment tool 214 mounted on the spray gun 312 and such that the alignment tool 214 is secured on the spray gun 312. The alignment tool 214 is mountable to the spray gun 312 such that alignment tool 214 remains mounted on spray gun 312 even when alignment tool 214 is released by the user. The user can dismount alignment tool 214 by pulling alignment tool 214 away from spray gun 312, such as in first axial direction AD1, causing the tabs 258 to flex as tabs 258 pass over portions of spray gun 312. Tabs 258 can be considered to form a snap-connect style interface with a spray gun (e.g., manual or automatic), though it is understood that other securement types are possible.

In the example shown, inner protrusions 260 are configured to interface with the spray gun, such as with portions of air cap assembly 218, to secure alignment tool 214 on the spray gun. Inner protrusions 260 are formed on tabs 258. Inner protrusions 260 are formed on the radially inner side of tabs 258 and are oriented inwards towards chamber 242. In the example show, inner protrusions 260 extend into chamber 242. Inner protrusion 260 can pass over the mounting face of spray gun 312 and tab 258 can cause inner protrusion 260 to spring radially inward to engage with the mounting face of spray gun 312. Inner protrusion 260 is configured to prevent sliding of alignment tool 214 in first axial direction AD1 off of the spray gun 312 with inner protrusion 260 interfacing with the mounting face of spray gun 312.

Inner protrusions 260 are configured to engage with portions of spray gun 312 to retain alignment tool 214 on spray gun 312. Mount face 266*a* is formed as a sloped face of inner protrusion 260. Mount face 266*a* extends both radially inwards towards tool axis TA from the inner surface of tab 258 and axially in second axial direction AD2. Mount face 266*a* is configured to engage with a portion of the spray gun to mount alignment tool 214 on the spray gun.

Mount face 266*b* is disposed on an opposite side of inner protrusion 260 from mount face 266*a*. Mount face 266*b* is formed as a sloped face of inner protrusion 260. Mount face 266*b* extends both radially inwards towards tool axis TA from inner surface of tab 258 and axially in first axial direction AD1. Mount face 266*b* can engage with a portion of the spray gun during mounting as alignment tool 214 shifts in second axial direction AD2. The mount face 266*b* is sloped to engage with the spray gun 312 and such that the force exerted on mount face 266 flexes tab 258 outwards away from tool axis TA to allow tab 258 to pass over that portion of the spray gun 312 and snap back into a locked state on sprayer.

Inner face 268 extends between mount face 266*a* and mount face 266*b*. Inner face 268 is configured to slide on portions of spray gun 312 during mounting and dismounting of alignment tool 214. Inner face 268 can be configured as a smooth face to prevent wear of alignment tool 214 and/or spray gun due to the relative sliding. Inner face 268 can be formed as a planar face. Inner face 268 can be formed as a curved face extending arcuately around the tool axis TA.

Retainers 254 are disposed on the exterior side of tool body 232. Retainers 254 can be considered to form housings of the path indicator 250, in the example shown. Each retainer 254 is configured to engage with a projection 252 to retain the projection 252 on the alignment tool 214, in the example shown. In light-based examples, retainers 254 can be formed as housings that contain the laser diode that generates the light beam forming the projection 252. In the example shown, alignment tool 214 includes two retainers 254 associated with two projections 252, though it is understood that other numbers are possible, such as one, three, four, five, or more.

Each retainer 254 extends radially outward from the exterior surface of tool body 232. In the example shown, retainers 254 are axially elongate. In the example shown, each retainer 254 includes a slot 270 that extends through retainer 254. In the example shown, slot 270 is axially elongate. Slot 270 extends along a slot axis LA. Slot axis LA can be disposed parallel to the tool axis TA. Additionally or alternatively, the slot axis LA can be disposed parallel to the spray axis SA with the alignment tool 214 mounted to the spray gun.

In the example shown, the slot 270 extends fully through retainer 254 between retainer opening 272*a* through which the associated path indicator 250 projects and retainer opening 272*b* through which the associated path indicator 250 projects. It is understood, however, that not all examples are so limited. For examples, retainer 254 can include a single opening through which the path retainer 254 projects, such as retainer opening 272*a*. For example, retainer 254 can be configured with an internal spool supporting projection 252 such that projection 252 can retract into retainer 254 through retainer opening 272*a* to spool on the spool and can be extended through retainer opening 272*a* to unspool.

Retainers 254 are formed on the exterior surfaces of tabs 258, in the example shown. It is understood that other examples of alignment tool 214 can include retainers 254 disposed on other exterior surfaces of tool body 232. For example, retainers 254 can be partially disposed on tabs 258 and partially disposed on other portions of tool body 232. Retainers 254 can be partially or fully disposed on side wall 239 of tool body 232.

In the example shown, retainers 254 are disposed on opposite sides of alignment tool 214. Specifically, the retainers 254 shown are disposed 180-degrees apart from each other about the tool axis TA. The retainers 254 being disposed opposite each other relative to the tool axis TA aligns distal end 274 of path indicator 250 on tool axis TA as the projections 252 come together at path indicator tip 276. It is understood that in the example shown the path indicator tip 276 can be considered to form the intersect location 256.

Projections 252 extend in first axial direction AD1 away from tool body 232. Projections 252 extend axially in first axial direction AD1 and radially inward towards axis SA to converge to path indicator tip 276. It is understood that projections 252 do not necessarily contact each other at the intersect location 256. Instead, the intersect location 256 is a location where the ends of the projections 252 converge together and are retained relative to each other. In the example shown, projections 252 are disposed in indicator housing 282 and do not contact each other, though it is understood that not all examples are so limited. In some examples, the projections 252 can converge to contact each other at the intersect location 256.

Path indicator tip 276 extends in first axial direction AD1 between intersect location 256 and distal end 274. Path indicator tip 276 forms an extension that extends along tool axis TA. In the example shown, path indicator tip 276 is axially elongate. Path indicator tip 276 can extend along tool axis TA such that path indicator tip 276 is aligned on tool axis TA, though it is understood that not all examples are so limited.

Path indicator tip 276 includes indicator housing 282 and indicator spur 284. Indicator spur 284 is configured to be aligned on the tool axis TA to provide an indication of a location aligned on the tool axis TA. In the example shown, the projections 252 mount to indicator housing 282, as discussed in more detail below. The projections 252 can be removably mounted to path tip indicator 276 to facilitate installation and removal of path indicator 250 on alignment tool 214. Distal end 274 is formed at a tip of indicator spur 284 in the example shown.

In the example shown, projections 252 extend fully through slots 270 of retainers 254. Stop 278 is formed on each projection 252. Stop 278 is formed on a portion of projection 252 disposed on an opposite side of retainer 254 from path indicator tip 276. Stop 278 is formed at the end of projection 252 opposite path indicator tip 276, in the example shown.

Stop 278 is configured to prevent projection 252 from dismounting from tool body 232. Stop 278 is configured to prevent projection 252 from being pulled out of retainer 254. Stop 278 can set the maximum desired gap distance D2 of alignment tool 214. In the example shown, stop 278 is an enlargement that does not fit within slot 270 and instead interfaces with the body of retainer 254 to prevent further movement of projection 252 in first axial direction AD1. During operation, if projections 252 are pulled in first axial direction AD1 to increase the desired gap distance D2, then stop 278 will engage with retainer 254 when projection 252 is at a maximum distance from tool body 232. It is understood that not all examples include stops 278. In some examples, projections 252 are mounted within slots 270 by interference fits that inhibit displacement of the projection 252 within the slot 270.

Path indicator 250 is configured such that the desired gap distance D2 indicated by alignment tool 214 can be adjusted. In the example shown, projections 252 are movable relative to retainers 254 to adjust the desired gap distance D2 indicated by path indicator 250. In the example shown, projections 252 can be moved in second axial direction AD2 such that projections 252 slide through slots 270 to decrease the distance between tool body 232 and path indicator tip 276, and projections 252 can be moved in first axial direction AD1 such that projections 252 slide through slots 270 to increase the distance between tool body 232 and path indicator tip 276. Stops 278 interface with retainers 254 to limit movement of projections 252 in first axial direction AD1.

In some examples, projections 252 can include distance indicators that provide an indication of the desired gap distance D2 with projections 252 at various positions relative to tool body 232. For example, marks can be formed on the exterior of projection 252 at various intervals, such as an inch or fraction of an inch, and the alignment of the mark with a static indictor, such as formed on an axial end of the retainer 254 (e.g., the end of retainer 254 on which retainer opening 272*a* is formed), to provide a visual indication of the gap distance D2.

Path indicator 250 can be configured to assist in dismounting of alignment tool 214 from the spray gun. In the example shown, the user can grasp the physical projections 252 and pull in first axial direction AD1. The path indicator 250 can exert an axial force on tool body 232 to pull tool body 232 off of the spray gun. In the example shown, the projections 252 can exert an axial driving force on tool body 232 by the interface between stops 278 and retainers 254 to pull the alignment tool 214 off of the spray gun.

Figure 11:
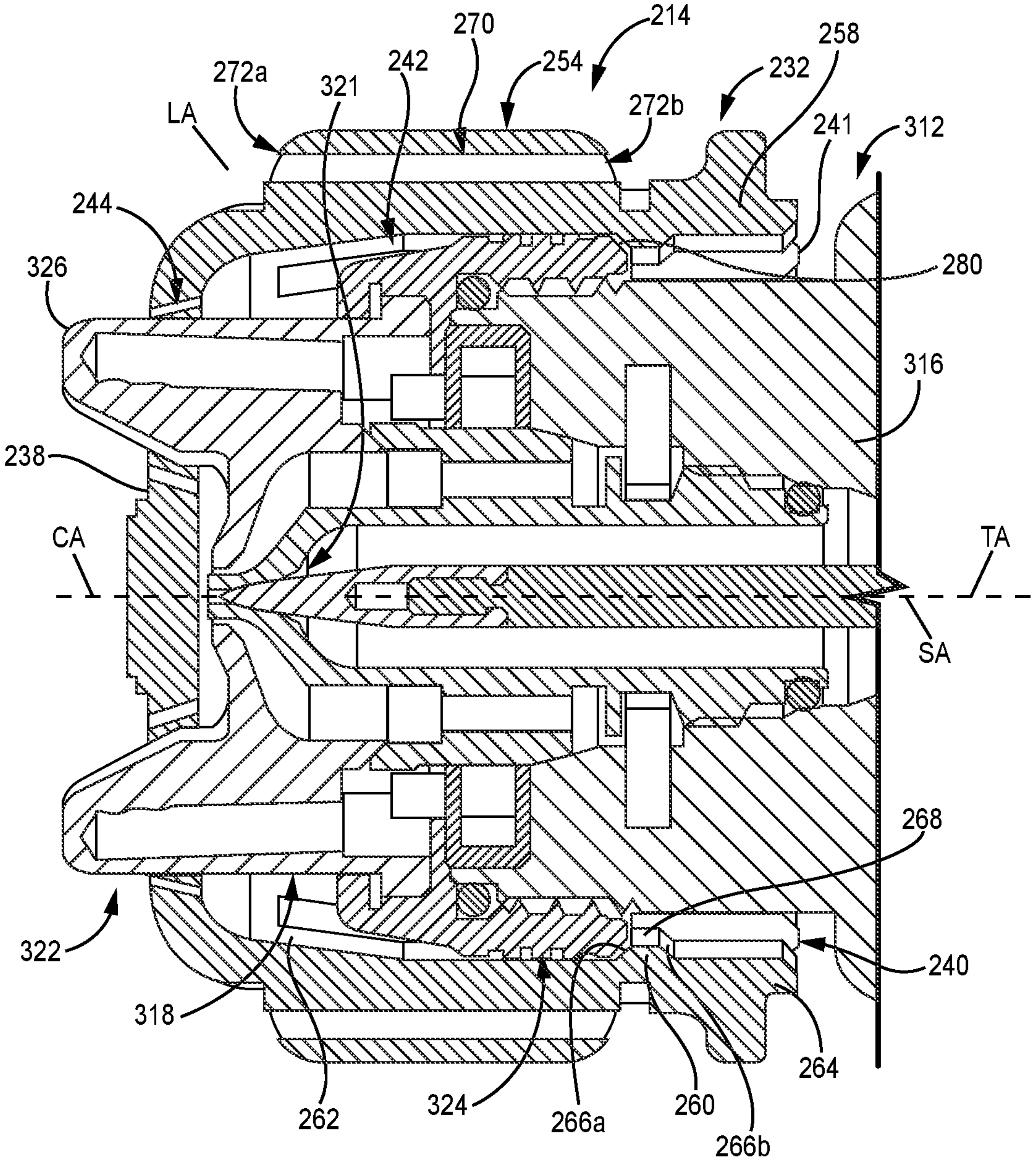
FIG. 11 is a cross-sectional view of a portion of a spray gun showing an alignment tool mounted on the spray gun.

FIG. 11 is a cross-sectional view of a portion of spray gun 312 showing alignment tool 214 mounted on spray gun 312. Gun body 316, spray valve 321, and air cap assembly 318 of spray gun 312 are shown. Air cap assembly 318 includes air cap 322 and cap housing 324. Tool body 232, annular edge 241, receiving openings 244, tabs 258, inner protrusions 260, and retainers 254 of alignment tool 214 are shown. Tool body 232 includes closed end 238, side wall 239, and open end 240.

Air cap assembly 318 is mounted to gun body 216 of spray gun 312. Air cap assembly 318 is substantively similar to air cap assembly 18 (FIG. 2), air cap assembly 118 (FIG. 7), and air cap assembly 218 (FIG. 8). Similar or same components of air cap assembly 318 have the same reference number as air cap assembly 18 except increased by "300." can have the same reference number as air cap assembly 118 except increased by "200." and can have same or similar reference numbers as air cap assembly 218 except increased by "100."

It is understood that spray gun 312 can be an automatic spray gun (e.g., spray gun 12 (best seen in FIG. 2), spray gun 112 (FIG. 7)) or a manual spray gun (e.g., spray gun 212

(FIG. 8)). Air cap 322 is disposed over the end of spray gun 312. Air cap 322 is configured to emit streams of air, such as for atomizing and/or shaping the spray liquid output from nozzle 330 of spray gun 312. The needle of spray valve 321 is configured to shift in second axial direction AD2 to open spray valve 321 to release a spray of spray liquid and is configured to shift in first axial direction AD1 to a close spray valve 321 to stop emission of the spray liquid.

Cap housing 324 engages with air cap 322 and secures air cap 322 to gun body 316. Cap housing 324 extends around air cap 322. Cap housing 324 engages gun body 316 at a threaded interface in the example shown. Air horns 326 extend through receiving openings 244.

Alignment tool 214 is mountable to the spray gun 312 and is configured to engage with portions of spray gun 312 to maintain alignment tool 214 mounted on spray gun 312 when alignment tool 214 is released by the user. The alignment tool 214 does not need to be manually held on the spray gun 312 throughout operation. In the example shown, alignment tool 214 engages with a portion of cap housing 324 to mount alignment tool 214 on spray gun 312, though it is understood that alignment tool 214 can be configured to engage with any desired portion of spray gun 312. Alignment tool 214 can mount to spray gun 312 such that tool axis TA is coaxial with spray axis SA, the coaxial arrangement indicated by common axis CA in FIG. 10.

Tabs 258 are configured to engage with spray gun 312 to mount alignment tool 214 on spray gun 312. In the example shown, inner protrusions 260 extend from an inner surface of tabs 258 and inward towards the common axis CA. Inner protrusions 260 are configured to engage with cap housing 324 to retain alignment tool 214 on the spray gun 312 in the example shown. Alignment tool 214 can be configured such that inner protrusions 260 on tabs 258 are the only projections that extend to engage with spray gun 312 to inhibit axial movement of alignment tool 214 off of spray gun 312. In some examples, alignment tool 214 does not include any other projections that extend from the interior surface of tool body 232 to engage with spray gun 312. In the example shown, tabs 258 are disposed on opposite sides of alignment tool 214. Specifically, the tabs 258 shown are disposed 180-degrees apart from each other about the common axis CA.

Inner protrusions 260 extend radially inwards towards the spray axis SA of spray gun. Mount face 266*a* is oriented in first axial direction AD1. Mount face 266*a* is formed as a sloped surface. Mount face 266*a* is configured to interface with mount surface 280 of spray gun 312 to retain alignment tool 214 on air cap 322. In the example shown, mount surface 280 is formed by a portion of cap housing 324. Mount surface 280 is oriented in second axial direction AD2. Mount surface 280 is formed as a sloped surface that interfaces with the sloped mount face 266*a* to retain alignment tool 214 on spray gun 312.

The sloped interface between mount surface 280 and mount face 266*a* extends both axially and radially and facilitates dismounting of alignment tool 214 from spray gun 312. Alignment tool 214 is pulled in first axial direction AD1 relative to spray gun 312 to dismount alignment tool 214 from spray gun 312. Mount face 266*a* slides on mount surface 280 and mount surface 280 exerts a radial force on inner protrusion 260, pushing tabs 258 radially outward as alignment tool 214 shifts in first axial direction AD1. The tabs 258 are flexed outward and inner protrusion 260 passes over, and can engage with and slide on, the exterior of cap housing 324. Alignment tool 214 is thereby dismounted and can be stored or utilized on another sprayer for alignment, toolpathing, and/or training, among other operations.

In the example shown, inner protrusion 260 further includes mount face 266*b*. Mount face 266*b* is formed on an opposite axial side of inner protrusion 260 from mount face 266*a*. Mount face 266*b* is sloped similar to mount face 266*a*. Mount face 266*b* is formed as a sloped face of inner protrusion 260. Mount face 266*b* extends both radially inwards towards axis CA and axially in first axial direction AD1. Mount face 266*b* is configured as a first portion of inner protrusion 260 to interface with spray gun 312 during mounting of alignment tool 214 on spray gun 312. During mounting, alignment tool 214 is shifted in second axial direction AD2 and mount face 266*b* engages with a portion of cap housing 324. The interface between mount face 266*b* and cap housing 324 biases tab 258 outward. Such biasing increases a radial width between the opposing inner protrusions 260 in the example shown. The inner protrusion 260 shifts along the cap housing 324 until passing over mount surface 280 and then tabs 258 snap radially inward to axially overlap inner protrusion 260 with cap housing 324.

Tabs 258 can be formed of a material having sufficient resiliency such that tabs 258 spring back to the unflexed state by the material of the tab 258 shifting back to the unflexed state. In some examples, tabs 258 can be configured such that tabs 258 are canted radially inward as tabs 258 extend from the connected end 262 to the free end 264. As such, the free end 264 can be radially inward from the connected end 262 with the tab 258 in an unflexed state. In such a configuration, the tab 258 can be in a flexed state with alignment tool 214 mounted on spray gun 312. In such a configuration, tabs 258 can be configured such that tabs 258 remain in a flexed state with alignment tool 214 mounted on spray gun 312.

The tabs 258 can be configured to exert a radially inward force on the spray gun 312 such that the tabs 258 can be considered to clamp on spray gun 312. The spring force exerted by the tab 258 can bias the mount face 266*a* into engagement with mount surface 280 to clamp alignment tool 214 on spray gun 312. In some examples, the spring force can bias the inner surface of tab 258 into engagement with the outer surface of cap housing 324, such that the bodies of the tabs 258 exert the clamping force. Such clamping can inhibit rotation of alignment tool 214 on spray gun 312. Such rotational inhibition can be in addition to or as an alternative to air horns 226 extending into receiving openings 244. It is understood, however, that tabs 258 can be configured to lock alignment tool 214 axially relative to spray gun 312 (e.g., by the interface between mount face 266*a* and mount surface 280) without also exerting a clamping force on spray gun 312.

In the example shown, inner protrusion 260 further includes inner face 268. Inner face 268 is oriented radially inwards. Inner face 268 extends between mount face 266*a* and mount face 266*b*. Inner face 268 is formed as a flat face in the example shown. Inner face 268 can be formed as an arcuate face that extends about the axis CA. Additionally or alternatively, inner face 268 can be formed as a planar face. Inner face 268 is configured to engage with the exterior surface of cap housing 324 during mounting and dismounting of alignment tool 214.

Inner face 268 engages the exterior surface of air cap assembly 318 as alignment tool 214 shifts in first axial direction AD1 and second axial direction AD2 during mounting and dismounting of alignment tool 214 on spray gun 312. Tabs 258 are in the flexed state during mounting and dismounting such that tabs 258 are biased radially inward and into engagement with the exterior of cap housing 324. Inner face 268 is formed as a flat surface to provide a bearing surface that slides on cap housing 324, decreasing wear due to such relative sliding.

Retainers 254 project outward from the exterior surface of tool body 232. Retainers 254 are formed on tabs 258 in the example shown. Slot 270 extends through retainer 254 between retainer opening 272*a* and retainer opening 272*b*. Slot 270 extends axially in the example shown along slot axis LA. Slot axis LA can be parallel to the common axis CA. Retainer opening 272*a* is oriented in first axial direction AD1. Retainer opening 272*b* is oriented in second axial direction AD2. Retainer 254 is configured such that projection 252 can extend fully through the slot 270 and extend out of both retainer opening 272*a* and retainer opening 272*b*.

In the example shown, retainer opening 272*a* is spaced in second axial direction AD2 from the exterior side of closed end 238 of tool body 232. Retainer opening 272*a* is disposed such that projection 252 exits from slot 270 at a location axially closer to the opening of nozzle 330 than the exterior of closed end 238. Such a configuration provides a higher accuracy reading of the gap distance between nozzle 330 and the target surface TS than measuring such distance from the exterior of closed end 238. This can be particularly useful in examples in which projections 252 include distance indicators that provide an indication of the gap distance with projections 252 at various positions relative to cap housing 324. It is understood, however, that retainer opening 272*a* can be disposed at any desired location along cap housing 324. The indicators providing the gap distance information can be configured to account for the distance between the location of nozzle 330 and the location that projections 252 extend from retainer opening 272*a*.

Alignment tool 214 provides significant advantages. Alignment tool 214 is configured to mount on a spray gun 312 to be supported by the spray gun 312. In the example shown, tabs 258 are configured to flex during mounting and dismounting and are configured to engage with spray gun 312 to secure alignment tool 214 on spray gun 312. The example shown includes inner protrusions 260 that engage with cap housing 324 of air cap 322.

Alignment tool 214 is configured to provide information regarding the desired gap distance D2 between spray gun 312 and a target surface TS. Path indicator 250 projects beyond the alignment tool 214 to indicate locations that the spray liquid will be sprayed to. Path indicator 250 provides feedback regarding the actual gap distance prior to actually commencing spray operations.

Figure 12:
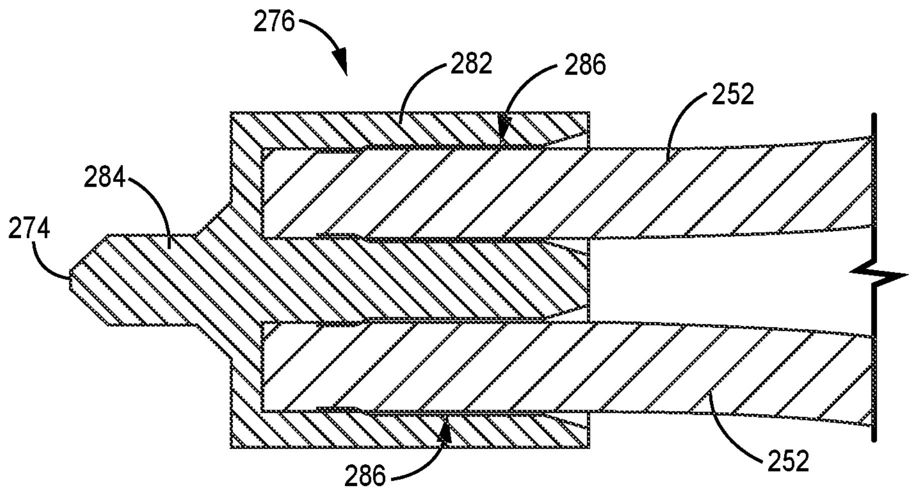
FIG. 12 is a cross-sectional view taken along line 12-12 in FIG. 10B showing a portion of a path indicator of an alignment tool.

FIG. 12 is a cross-sectional view of indicator tip 276 taken along line 12-12 in FIG. 10B. The projections 252 are mounted to indicator tip 276. In the example shown, each projection 252 extends into a tip bore 286 formed in the indicator housing 282. The tip bores 286 are open in second axial direction AD2. The tip bores 286 do not extend fully axially through the indicator housing 282 in the example shown. Projections 252 mount to indicator tip 276 by interference fits in the example shown.

Indicator spur 284 extends from indicator housing 282. Indicator spur 284 extends from an opposite axial end of indicator housing 282 from the end that projections 252 extend into. The indicator spur 284 is disposed on the tool axis TA. The indicator spur 284 extends from a location between the tip bores 286 in the example shown. The indicator spur 284 extends to distal end 274.

While the invention has been described with reference to an exemplary embodiment(s), it will be understood by those skilled in the art that various changes may be made and equivalents may be substituted for elements thereof without departing from the scope of the invention. The particular offsets and ratios illustrated and described herein are offered only by way of example, not limitation. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An alignment tool for a spray gun, the alignment tool comprising:
- a tool body extending about an axis and between a first end and a second end, the second end being open to accept a front end of the spray gun into a cavity defined by the tool body; and
- a path indicator supported by the tool body, the path indicator including a first projection extending outward away from the tool body and a second projection extending outward away from the body;
- wherein the first projection and the second projection extend inwards towards the axis to meet at an intersect location spaced axially from the first end.

2. The alignment tool of claim 1, wherein the first projection and the second projection are movable relative to the tool body to increase and decrease a distance between the first end and a distal end of the path indicator.

3. The alignment tool of claim 2, wherein the first projection extends into a first opening of a first receiver, the first receiver projecting from an exterior of the tool body.

4. The alignment tool of claim 3, wherein the first projection extends out of the first receiver through a second opening of the first receiver, such that the first projection extends fully through a slot through first receiver, the slot extending between the first opening and the second opening.

5. The alignment tool of claim 3, wherein the second projection extends into a first opening of a second receiver, the second receiver projecting from the exterior of the tool body.

6. The alignment tool of claim 5, wherein the first receiver is disposed on an opposite side of the tool body from the second receiver.

7. The alignment tool of claim 5, wherein the first receiver is disposed 180- degrees about the axis from the second receiver.

8. The alignment tool of claim 5, wherein the tool body includes:
- a first tab extending from an interface with a sidewall of the tool body to a distal end of the first tab, wherein the first receiver extends from an exterior side of the first tab.

9. The alignment tool of claim 8, wherein the first tab is cantilevered from the interface.

10. The alignment tool of claim 8, wherein an inner protrusion extends inward from an interior side of the first tab.

11. The alignment tool of claim 10, wherein the inner protrusion extends into the cavity.

12. The alignment tool of claim 10, wherein the inner protrusion includes a first sloped face oriented in a first axial direction along the axis, the first sloped face configured to engage a blocking surface of the spray gun to mount the alignment tool to the spray gun.

13. The alignment tool of claim 12, wherein the inner protrusion includes a second sloped face oriented in a second axial direction along the axis, the second axial direction opposite the first axial direction.

14. The alignment tool of claim 11, wherein the first receiver is fully disposed on the first tab.

15. The alignment tool of claim 1, further comprising:

a first engagement surface disposed at the first end, the first engagement surface at least partially defining a first opening configured to receive a first air horn of an air cap of the spray gun; and a second engagement surface disposed at the first end, the second engagement surface at least partially defining a second opening configured to receive a second air horn of the air cap;

wherein the first engagement surface is configured to interface with the first air horn and the second engagement surface is configured to interface with the second air horn to exert a rotational force on the air cap about a spray axis through the air cap.

16. The alignment tool of claim 1, wherein the path indicator comprises:

an indicator housing having a first tip bore extending into a first end of the indicator housing and a second tip bore extending into the first end of the indicator housing; and wherein the first projection is mounted to the indicator housing within the first tip bore and the second projection is mounted to the indicator housing within the second tip bore.

17. The alignment tool of claim 16, wherein the indicator housing includes an indicator spur extending from a second end of the indicator housing.

18. An alignment tool for a spray gun, the alignment tool comprising:

a tool body extending about an axis and between a first end and a second end, the second end being open to accept a front end of the spray gun into a cavity defined by the tool body;

a tab connected to the tool body at an interface between the tab and the tool body, the tab cantilevered from the interface and extending towards the second end from the interface, the tab supporting an inner protrusion extending inward towards the axis from an inner side of the tab, the inner protrusion spaced away from the interface along the tab and configured to engage the spray gun to mount the alignment tool on the spray gun, wherein the interface is disposed between the first end and the second end; and a path indicator supported by the tool body, the path indicator including a first projection extending outward away from the tool body.

* * * * *